United States Patent
Tanaka et al.

(10) Patent No.: US 8,929,611 B2
(45) Date of Patent: Jan. 6, 2015

(54) MATCHING DEVICE, DIGITAL IMAGE PROCESSING SYSTEM, MATCHING DEVICE CONTROL PROGRAM, COMPUTER-READABLE RECORDING MEDIUM, AND MATCHING DEVICE CONTROL METHOD

(75) Inventors: Hiroyuki Tanaka, Kyoto (JP); Atsushi Irie, Kyoto (JP); Shun Sakai, Kyoto (JP)

(73) Assignee: OMRON Corporation, Kyoto-shi, Kyoto (JP)

( * ) Notice: Subject to any disclaimer, the term of this patent is extended or adjusted under 35 U.S.C. 154(b) by 444 days.

(21) Appl. No.: 13/032,340

(22) Filed: Feb. 22, 2011

(65) Prior Publication Data

US 2011/0222743 A1 Sep. 15, 2011

(30) Foreign Application Priority Data

Mar. 15, 2010 (JP) ................................. 2010-058549

(51) Int. Cl.
*G06K 9/00* (2006.01)

(52) U.S. Cl.
CPC .................................. *G06K 9/00288* (2013.01)
USPC ............................ 382/115; 382/116; 382/118

(58) Field of Classification Search
None
See application file for complete search history.

(56) References Cited

U.S. PATENT DOCUMENTS

2004/0247177 A1 12/2004 Rowe et al.

FOREIGN PATENT DOCUMENTS

| EP | 1998286 A1 | 12/2008 |
|---|---|---|
| JP | 2000-306095 A | 11/2000 |
| JP | 2005-004454 A | 1/2005 |
| JP | 2005-056004 A | 3/2005 |
| JP | 2005-115481 A | 4/2005 |
| JP | 2006-031387 A | 2/2006 |
| JP | 2007-226441 A | 9/2007 |

OTHER PUBLICATIONS

Beymer, "Face Recognition Under Varying Pose", Massachusetts Institute of Technology Artificial Intelligence Laboratory. 1993.*
Patent Abstracts of Japan, Publication No. 2005-115481, Publication Date: Apr. 28, 2005, 1 page.
Patent Abstracts of Japan, Publication No. 2006-031387, Publication Date: Feb. 2, 2006, 1 page.
Patent Abstracts of Japan, Publication No. 2007-226441, Publication Date: Sep. 6, 2007, 1 page.
Patent Abstracts of Japan, Publication No. 2005-004454, Publication Date: Jan. 6, 2005, 1 page.

(Continued)

*Primary Examiner* — Randolph I Chu
(74) *Attorney, Agent, or Firm* — Osha Liang LLP

(57) ABSTRACT

A high-accuracy matching result is obtained when a condition of a photographed input image differs from a condition of a photographed registration image. A face matching device including the registration face image, in which a person is photographed, and a photographing condition which corresponds to the registration face image are registered in a registration face image database. The face matching device includes a condition detecting unit, a registration face image selecting unit, and a matching unit. The condition detecting unit detects a photographing condition in the input face image which includes the photographed person. The registration face image selecting unit determines and selects the closest of the photographing condition from the input face image with the photographing conditions of the registration face images based on the determined closeness of the photographing condition. The matching unit performs matching using the registration face image corresponding to the selected photographing condition.

13 Claims, 28 Drawing Sheets

(56) References Cited

OTHER PUBLICATIONS

Patent Abstracts of Japan, Publication No. 2000-306095, Publication Date: Nov. 2, 2000, 1 page.
Patent Abstracts of Japan, Publication No. 2005-056004, Publication Date: Mar. 3, 2005, 1 page.
Extended European Search Report for Application No. 10196713.1 mailed May 17, 2011 (9 pages).
Beymer D J; XP-010099341 "Face Recognition Under Varying Pose"; IEEE Computer Society Conference Computer Vision and Pattern Recognition. Proceedings, IEEE Computer Society, US, Jun. 21, 1994, pp. 756-761.
Pentland A et al XP000197979 "View-Based and Modular Eigenspaces for Face Recognition", Proceedings IEEE Computer Society Conference on Computer Vision and Pattern Recognition; Jan. 1, 1994, pp. 1-7.
Sang-Il Choi et al: XP031154716 "An Effective Face Recognition Under Illumination and Pose Variations", Neural Networks, 2007 IJCNN 2007, International Joint Conference on, IEEE Piscataway, NJ, USA Aug. 1, 2007 pp. 914-919.
Wu-Jun Li et al: XP019014220 vol. 3611 "A Multiple Eigenspaces Constructing Method and Its Application to Face Recognition", Advances in Natural Computation; [Lecture Notes in Computer Science; LNCS], Springer-Verlag, Berlin/Heidelberg, Jul. 23, 2005, pp. 55-64.
Yu-Feng, Lu and Zeng-Cai, W. and Xue-Zhong, Liu: XP002631718 vol. 34 "A New PCA Method to Increase Recognition Rate", Optical Technique, Jan. 1, 2008, p. 10.
Zhang X et al: XP026250877 vol. 42, No. 11, DOI "Face Recognition Across Pose: A Review", Pattern Recognition Elsevier, GB, Nov. 1, 2009, pp. 2876-2896.
Belhumeur, P.N.: XP002631719 "Ongoing Challenges in Face Recognition", Frontiers of Engineering: Reports on Leading-Edge Engineering From the 2005 Symposium, 2006, pp. 1-8.
Panpan Huang et al: XP031383835 "A New Method for Multi-View Face Clustering in Video Sequence", Data Mining Workshops, 2008. ICDMW '08. IEEE International Conference On, IEEE, Piscataway, NJ, USA, Dec. 15, 2008, pp. 869-873.
Turk M et al: XP000490270 vol. 3, No. 1, "Eigenfaces for Recognition", Journal of Cognitive Neuroscience, Cambridge, MA, US, Jan. 1, 1991, p. 81.
Lu Yu-feng et al. "A New PCA Method to Increase Recognition Rate", XP-002631718 vol. 34 No. 1, Jinan, China Jan. 2008 (1 page).
David J. Beymer, "Face Recognition Under Varying Pose", XP-010099341, Cambridge, MA Jun. 21, 1994 (6 pages).
Alex Pentland et al., "View-Based and Modular Eigenspaces for Face Recognition", XP 000197979, Cambridge, MA 1994 (7 pages).
Sang-Il Choi et al., "An Effective Face Recognition Under Illumination and Pose Variations", XP 31154716, Orlando, Florida, USA, Aug. 12-17, 2007 (6 pages).
Wu-Jun Li et al., "A Multiple Eigenspaces Contructing Method and its Application to Face Recognition" XP 19014220, Nanjing China, 2005 (10 pages).
Castillo et al., "Using Stereo Matching with General Epipolar Geometry for 2D Face Recognition across Pose." IEEE Transactions on Pattern Analysis and Machine Intelligence, vol. 31, No. 12, Dec. 2009, pp. 2298-2304 (7 pages).

\* cited by examiner

US 8,929,611 B2

MATCHING DEVICE, DIGITAL IMAGE PROCESSING SYSTEM, MATCHING DEVICE CONTROL PROGRAM, COMPUTER-READABLE RECORDING MEDIUM, AND MATCHING DEVICE CONTROL METHOD

BACKGROUND OF THE INVENTION

1. Technical Field

One or more embodiments of the present invention relates to a matching device that performs matching processing of image data including an object such as a face of a person.

2. Related Art

Conventionally there is proposed a face matching device in which a face recognition technology is utilized to perform matching of a face of a person included in a face image photographed with a digital camera.

In the face matching device, the face image including the face of the person is previously registered in a database, and an input face image obtained by the photographing is matched with the database.

At this point, in the face recognition technology, it is well known that recognition accuracy depends on a photographing condition of the face image. Examples of the photographing condition include a face orientation, a facial expression, and lighting orientation and intensity.

When the photographing condition of the input face image is not matched with the photographing condition of the registration face image, because the recognition accuracy is degraded, sometimes the matching ends in failure even if the person included in the input face image is identical to the person included in the registration face image.

Therefore, conventionally the following technologies are proposed to prevent the degradation of the recognition accuracy by devising means of using the registration data.

In Japanese Unexamined Patent Publication No. 2005-115481, plural face images obtained by performing the photographing under different photographing conditions are registered in the database along with the photographing conditions, and 1:N matching is performed to the face images in the matching.

The technology disclosed in Japanese Unexamined Patent Publication No. 2005-115481 will specifically be described with reference to FIG. 22. As illustrated in FIG. 22, the face images and the photographing conditions are previously stored in a registration face image database 1021 with respect to each of persons Mr. A, Mr. B, and Mr. C.

Photographing conditions of a "front face (0 to 15 degrees)", a "slightly oblique face (15 to 45 degrees)", an "oblique face (45 to 75 degrees)", and a "side face (75 to 90 degrees)" are registered with respect to Mr. A while corresponding to face images A1101, A1102, A1103, and A1104, respectively.

The photographing conditions of the "front face (0 to 15 degrees)" and the "slightly oblique face (15 to 45 degrees)" are registered with respect to Mr. B while corresponding to face images B1101 and B1102, respectively.

The photographing conditions of the "front face (0 to 15 degrees)" and the "slightly oblique face (15 to 45 degrees)" are registered with respect to Mr. C while corresponding to face images C1101 and C1102, respectively.

During the matching, a degree of similarity is determined with respect to all the registration face images, the person is identified from the photographing condition with respect to the face image having the highest degree of similarity.

In Japanese Unexamined Patent Publication No. 2006-31387, plural images are registered in consideration of fluctuating factor such as a lighting condition, an attitude, and a facial expression with respect to an individual registration person, and the matching is performed using a representative face image produced from the images.

The technology disclosed in Japanese Unexamined Patent Publication No. 2006-31387 will specifically be described with reference to FIG. 23. As illustrated in FIG. 23, the face images and the photographing conditions are previously stored with respect to each of the persons Mr. A, Mr. B, and Mr. C, and the representative face images are produced based on the face images and the photographing conditions.

A face image A1201 of a photographing condition of a "front face", a face image A1202 of a photographing condition of a "slightly oblique face", and a face image A1203 of a photographing condition of an "oblique face" are registered with respect to Mr. A. A face image B1201 of the photographing condition of the "front face" and a face image B1202 of the photographing condition of the "slightly oblique face" are registered with respect to Mr. B. A face image C1202 of the photographing condition of the "slightly oblique face" and a face image C1203 of the photographing condition of the "oblique face" are registered with respect to Mr. C.

A representative image D1201 is produced with respect to Mr. A based on the face images A1201 to A1203. A representative image D1202 is produced with respect to Mr. B based on the face images B1201 and B1202, and a representative image D1203 is produced with respect to Mr. C based on the face images C1202 and C1203.

During the matching, the degree of similarity between the input face image and the representative face image is determined, and the individual registration face image that corresponds to the representative face image determined as the low degree of similarity is removed from the matching target. In Japanese Unexamined Patent Publication No. 2006-31387, representative face images are hierarchically produced as illustrated in FIG. 24. FIG. 24 illustrates the state in which, in order to perform the matching processing, the representative images are produced in three hierarchical layers of a representative image in a sex unit, a representative image in an age unit, and a representative image of a person.

For example, a representative image D1231 of Mr. A is produced from individual images A1241 and A1242. The same holds true for Mr. B to Mr. G. A teenage representative image D1221 is produced from the representative image D1231 of Mr. A and a representative image D1232 of Mr. B. A man's representative image D1211 is produced from the teenage representative image D1221, a twentysomething representative image D1222, and a thirtysomething representative image D1223.

During the matching, the person is specified by sequentially comparing the input face image to each of the hierarchical layers of the representative image in the sex unit, the representative image of the age unit, and the representative image of the person.

In Japanese Unexamined Patent Publication No. 2007-226441, a feature amount vector that is obtained from the face image photographed under a certain condition (such as the lighting, the face orientation, the facial expression, and the age) is converted into a feature amount vector under another condition. Therefore, during the matching, the photographing condition of the input face image is matched with the photographing condition of the image that becomes the matching target.

For example, as illustrated in FIG. 25, a face image A1301 of a photographing condition of a "dark face" is registered in a registration face image database 1321 with respect to Mr. A, the feature amount vector is converted by a feature amount converter 1301A to obtain a face image A1311 of a photographing condition of a "bright face" and a face image A1312 of a photographing condition of a "slightly dark face", and the face image A1311 and the face image A1312 are stored in a post-conversion feature amount database.

In Japanese Unexamined Patent Publication No. 2005-4454, only the face image suitable for the face recognition is registered in registering the face image. For example, only a front face image is registered as a condition suitable to recognize the face image. During the face recognition, a determination whether the person included in the input face image faces front is made to recognize only the face image to which the face recognition can be performed, thereby improving the recognition accuracy.

For example, as illustrated in FIG. 26, registration face images A1401, A1402, and A1403 of the photographing condition of the "front face" are registered in a registration face image database 1421 with respect to Mr. A, Mr. B, and Mr. C, respectively. The matching of an input face image P1401 of the photographing condition of the "front face" is performed using the registration face images A1401, A1402, and A1403.

In Japanese Unexamined Patent Publication No. 2000-306095, parameters such as the lighting condition and photographing direction of the input face image are estimated, a parameter adjustment is performed to the registration face image with a target set at the parameter of the input face image, the matching face image is produced, and the matching of the matching face image is performed using the input face images.

For example, as illustrated in FIG. 27, the following registration face images are registered in a registration face image database 1521 with respect to Mr. A, Mr. B, and Mr. C.

A registration face image A1502 of the photographing condition of the "slightly oblique face" and a registration face image A1504 of the photographing condition of the "side face" are registered with respect to Mr. A.

A registration face image B1501 of the photographing condition of the "front face" is registered with respect to Mr. B. A registration face image C1501 of the photographing condition of the "front face" and a registration face image C1502 of the photographing condition of the "slightly oblique face" are registered with respect to Mr. C.

During the matching, matching images A1511, B1511, and C1511 are produced from the registration face images of the photographing conditions closest to the photographing condition of the "oblique face" of an input face image P1501 with respect to Mr. A, Mr. B, and Mr. C, respectively.

For example, the matching images A1511, B1511, and C1511 of the photographing condition of the "oblique face" are produced based on the registration face image A1502 with respect to Mr. A, the registration face image B1501 with respect to Mr. B, and the registration face image C1502 with respect to Mr. C, respectively. The matching of the input face image P1501 is performed using the produced matching images.

In Japanese Unexamined Patent Publication No. 2005-56004, the registration face image under the designated condition is prepared in each registration person, and the matching is performed using the face image that is equal to the condition of the input face image, thereby improving the recognition accuracy.

The technology disclosed in Japanese Unexamined Patent Publication No. 2005-56004 will be described with reference to FIG. 28. Nine registration face images are prepared in each person with nine photographing conditions including the photographing conditions such as the "front face", an "upward face", a "downward face", a "face oriented toward left", and a "face oriented toward right". Registration face images A1601 to A1609, registration face images B1601 to B1609, and registration face images C1601 to C1609 are registered with respect to Mr. A, Mr. B, and Mr. C, respectively.

For example, when a input face image P1601 of the "downward face" is input during the matching, the matching processing is performed using the registration face images A1608, B1608, and C1608 of the photographing conditions that correspond to the photographing condition of the "downward face".

However, in the conventional technologies, unfortunately the recognition accuracy is degraded when the recognition is performed using the face image photographed under the photographing condition that is not registered in the database. The specific description is made as follows.

In the technologies disclosed in Japanese Unexamined Patent Publication Nos. 2005-115481 and 2006-31387, when the recognition is performed using the face image photographed under the photographing condition that is not registered in the database, possibly a person is falsely recognized as another person in which the photographing condition is registered.

The technology disclosed in Japanese Unexamined Patent Publication No. 2005-115481 will be described in detail again with reference to FIG. 22, when the face image data obtained by photographing the side face of Mr. B is input as the input face image, because the photographing condition of the "side face" is registered as the registration face image with respect to the Mr. A, the photographing condition of the input face image is matched with the photographing condition of the registration face image of Mr. A. Therefore, possibly the person included in the input face image is falsely regarded as Mr. A.

This is because the input face image of the photographing condition of the "side face" with respect to Mr. B is determined to be more similar to the registration face image A1104 of Mr. A photographed under the same photographing condition of the "side face" than the registration face image B1103 of the photographing condition of the "slightly oblique face" with respect to Mr. B.

In Japanese Unexamined Patent Publication No. 2006-31387, contents of the representative image depend on the photographing condition of the original individual face image. In FIG. 23, the individual face image A1203 of the photographing condition of the "oblique face" exists in the registration data of Mr. A. When the face image of Mr. B of the photographing condition of the "oblique face" is input as the input face image, the matching is incorrectly performed by the influence of the individual face image A1203. Therefore, Mr. B is not recognized as the matching result, but Mr. A is falsely recognized as the matching result.

In the technology disclosed in Japanese Unexamined Patent Publication No. 2007-226441, when the feature amount vector under a certain condition is converted into the feature amount vector under another condition, an error is generated from various factors, and therefore possibly false recognition is generated.

For example, because irregularity of a face depends on the person, the way of irradiating the face (the way of producing a shadow) varies even if the face is irradiated with the light having the same brightness from the same direction. Therefore, it is necessary to consider the individual variation in converting the condition in which the face is irradiated with the light. Accordingly, it is necessary that the feature amount converters 1301A to 1301C illustrated in FIG. 25 be prepared with respect to the persons Mr. A, Mr. B, and Mr. C. However, actually it is difficult to individually remove the error caused by the individual variation.

In the technology disclosed in Japanese Unexamined Patent Publication No. 2005-4454, when the face image of the photographing condition different from that of the registration data is provided as the input face image, for example, when the face image of the photographing condition of the "oblique face" is input while the face image of the photographing condition of the "front face" is registered, unfortunately the face recognition cannot be performed.

In the technology disclosed in Japanese Unexamined Patent Publication No. 2000-306095, the error is generated when the face image is produced from any viewpoint. In order to solve the problem, the images are previously prepared from plural viewpoints. However, it is unrealistic all, because the images cannot be prepared so as to satisfy the condition.

Only the matching between the pieces of registration data whose photographing conditions are matched with each other is described in the technology disclosed in Japanese Unexamined Patent Publication No. 2005-56004, and there is no description about the matching between the registration persons whose photographing conditions are not matched with each other. Therefore, it is assumed that the photographing conditions are uniformed in the pieces of registration data of all the persons. Accordingly, it is not assumed that the matching is performed using the face image photographed under the photographing condition that is not registered in the database.

SUMMARY

One or more embodiments of the present invention has been devised to implement a matching device that can improve the recognition accuracy when the matching is performed using the input image photographed under the photographing condition that is not registered in the database.

In accordance with one aspect of one or more embodiments of the present invention, there is provided a matching device that matches an input image in which an object is photographed with a registration image database in which a registration image obtained by photographing each object is registered to specify the object included in an input image by matching the input image, the registration image and a condition in which the object included in the registration image is photographed being registered in the registration image database while the registration image and the condition correspond to each other, the matching device including: condition detecting means for detecting the condition in which the object included in the registration image is photographed; condition determination means for determining closeness of a registration condition that is of the condition corresponding to the registration image and a detection condition that is of the condition detected from the input image; condition specifying means for specifying a registration condition closest to the detection condition detected from the input image in the registration conditions of the registration images registered common to the objects based on the determined closeness of the registration condition and the detection condition; and matching means for performing matching using the registration image corresponding to the specified registration condition.

In accordance with another aspect of one or more embodiments of the present invention, there is provided a method for controlling a matching device that matches an input image in which an object is photographed with a registration image database in which a registration image obtained by photographing each object is registered to specify the object included in an input image by matching the input image, the registration image and a condition in which the object included in the registration image is photographed being registered in the registration image database while the registration image and the condition correspond to each other, the matching device controlling method including the steps of: detecting the condition in which the object included in the registration image is photographed; determining closeness of a registration condition that is of the condition corresponding to the registration image and a detection condition that is of the condition detected from the input image; specifying a registration condition closest to the detection condition detected from the input image in the registration conditions of the registration images registered common to the objects based on the determined closeness of the registration condition and the detection condition; and performing matching using the registration image corresponding to the specified registration condition.

According to the configuration, the matching can be performed using the registration image that corresponds to the registration condition, which is closest to the detection condition of the input image and registered common to the persons.

As used herein, the matching means processing in which the object included in the input image is specified as one of the objects registered in the registration image database by determining the degree of similarity between the input image and the registered image.

The condition in which the object is photographed includes a condition relating to an environment in performing the photographing and a condition relating to a state of the object that becomes a subject.

The object means a physical body such as a person and a vehicle to which pattern recognition can be performed. The object may be part of a certain object. That is, a relationship between a certain object and a face of the person can be cited as an example.

Example of the condition relating to the environment in performing the photographing includes a face orientation of the person, in other words, an orientation of photographing means (such as a camera) with respect to the person, the facial expression, and the lighting orientation and intensity when the object is the person. Examples of the condition relating to the state of the object that becomes the subject include conditions, such as an estimated age and a sex of the person, which can be estimated from an appearance of the person.

Therefore, the closeness of the condition means how much angles are close to each other for the face orientation of the person, and the closeness of the condition means how much ages are close to each other for the estimated age of the person.

The matching is performed using the registration image that corresponds to the condition registered common to the objects, so that the conditions used in the matching can be uniformed.

The registration image that corresponds to the registration condition closest to the detection condition of the input image is used in the registration conditions in which the matching conditions are uniformed in the objects, so that the matching accuracy can be improved.

As a result, advantageously the high-accuracy matching result is obtained even if the detection condition in which the input image is photographed differs from the registration condition in which the registration image is photographed.

According to the matching device of one or more embodiments of the present invention, preferably, the condition determination means determines the closeness of the registration condition of the registration image and the detection condition detected from the input image with respect to a certain object registered in the registration image database, and as a result of the determination, the condition specifying means specifies the registration condition closest to the detection condition detected from the input image by determining whether a condition matched with the registration condition exists with respect to a certain object in a descending order of the closeness of the registration condition and the detection condition, the registration condition corresponding to a registration image of another object registered in the registration image database.

According to the configuration, the closeness of the registration condition of the registration image and the detection condition detected from the input image is determined with respect to a certain person. The registration condition closest to the detection condition detected from the input image is specified in the registration conditions of the registration images registered common to the persons based on the closeness of the condition determined with respect to a certain person.

At this point, a determination whether the registration condition of the registration image registered with respect to a certain person exists as the registration condition of the registration image of another person is made to specify the registration condition closest to the detection condition detected from the input image.

Thus, according to the configuration, a determination whether the registration condition of the registration image registered with respect to a certain person exists as the registration condition of the registration image of another person can sequentially be made to specify the registration condition of the registration image registered common to the person.

Therefore, the registration condition, which is closest to the detection condition detected from the input image and registered common to the person, can relatively simply and efficiently be specified even if the registration condition of the registration image registered common to the person is not previously checked.

In accordance with the aspect of one or more embodiments of the present invention, preferably, there is provided the matching device, further including selection means for previously selecting the registration condition of the registration image registered common to the objects, wherein the condition specifying means specifies the registration condition closest to the detection condition detected from the input image from the previously-selected registration conditions.

According to the configuration, the registration condition used in the matching is previously selected, so that advantageously speed enhancement of the matching processing and reduction of a processing load can be achieved.

In accordance with the aspect of one or more embodiments of the present invention, preferably, there is provided the matching device, further including: summary means for summarizing the number of registration conditions corresponding to the registration images registered in the registration image database in each registration conditions; and condition detecting means for detecting the registration condition in which the number of objects registered in the registration image database is matched with the number of summarized registration conditions, wherein the condition determination means specifies the registration condition closest to the detection condition detected from the input image from the detected registration conditions.

When the number of persons registered in the registration image database is matched with the number of registration conditions, the registration condition is the registration condition registered common to the persons.

According to the configuration, the registration conditions are summarized to determine whether the number of registration conditions is matched with the number of persons registered in the registration image database, so that advantageously the registration condition registered common to the persons can rapidly be obtained to achieve the speed enhancement of the matching processing.

According to the matching device of one or more embodiments of the present invention, preferably, the condition specifying means specifies the registration condition closest to the detection condition detected from the input image in each object when the registration condition of the registration image registered common to the objects does not exist.

According to the configuration, even if the registration condition of the registration image registered common to the persons does not exist, the registration condition closest to the detection condition detected from the input image can be specified in each person. The matching can be performed using the registration condition that corresponds to the specified registration condition.

Therefore, even if the registration condition of the registration image registered common to the persons does not exist, advantageously the registration conditions of the registration images used in the matching can be uniformed as much as possible to improve the matching accuracy.

According to the matching device of one or more embodiments of the present invention, preferably, the registration condition and the detection condition are specific values in continuous values indicating a photographing condition in which the object is photographed.

According to the configuration, the registration condition and the detection condition are specific values in continuous values indicating the photographing condition in which the person is photographed. Examples of the continuous value indicating the photographing condition include the direction in which the person is photographed and the estimated age of the person.

The matching is performed based on the continuous value, so that advantageously the matching can be performed based on the finer reference.

According to the matching device of one or more embodiments of the present invention, preferably, the object is a face of a person.

That is, the input image is the input face image in which the face of the person is photographed, and the registration face image obtained by photographing the face of the person is registered with respect to each person in the registration image database.

According to the configuration, advantageously the matching of the face of the person can be performed with high accuracy.

In accordance with another aspect of one or more embodiments of the invention, a digital image processing system includes the matching device and an image input device that supplies the input image to the matching device.

Examples of the digital image processing system include a printer, a scanner, a personal computer, and a digital camera. A configuration in which the matching device and the image input device are connected by a communication network may be adopted.

The matching device may be realized by a computer. In such cases, a matching device control program that realizes the matching device using the computer by operating the computer as each of the functions and a computer-readable recording medium in which the matching device control program is recorded are also included in the scope of one or more embodiments of the invention.

An aspect of one or more embodiments of the present invention relates to a matching device in which a registration image and a condition in which an object included in the registration image is photographed being registered in a registration image database while the registration image and the condition correspond to each other, the matching device includes: condition detecting means for detecting the condition in which the object included in the registration image is photographed; condition determination means for determining closeness of a registration condition that is of the condition corresponding to the registration image and a detection condition that is of the condition detected from the input image; condition specifying means for specifying a registration condition closest to the detection condition detected from the input image in the registration conditions of the registration images registered common to the objects based on the determined closeness of the registration condition and the detection condition; and matching means for performing matching using the registration image corresponding to the specified registration condition.

Another aspect of one or more embodiments of the present invention relates to a matching device controlling method in which a registration image and a condition in which an object included in the registration image is photographed being registered in a registration image database while the registration image and the condition correspond to each other, the matching device controlling method includes the steps of: detecting the condition in which the object included in the registration image is photographed; determining closeness of a registration condition that is of the condition corresponding to the registration image and a detection condition that is of the condition detected from the input image; specifying a registration condition closest to the detection condition detected from the input image in the registration conditions of the registration images registered common to the objects based on the determined closeness of the registration condition and the detection condition; and performing matching using the registration image corresponding to the specified registration condition.

Therefore, advantageously the high-accuracy matching result is obtained even if the condition in which the input image is photographed differs from the condition in which the registration image is photographed.

DETAILED DESCRIPTION

Hereinafter, preferred embodiments of the present invention will be described with reference to the drawings.

First Embodiment

A face matching device according to a first embodiment of the invention will be described with reference to FIG. 1 to FIG. 5.

Figure 1:
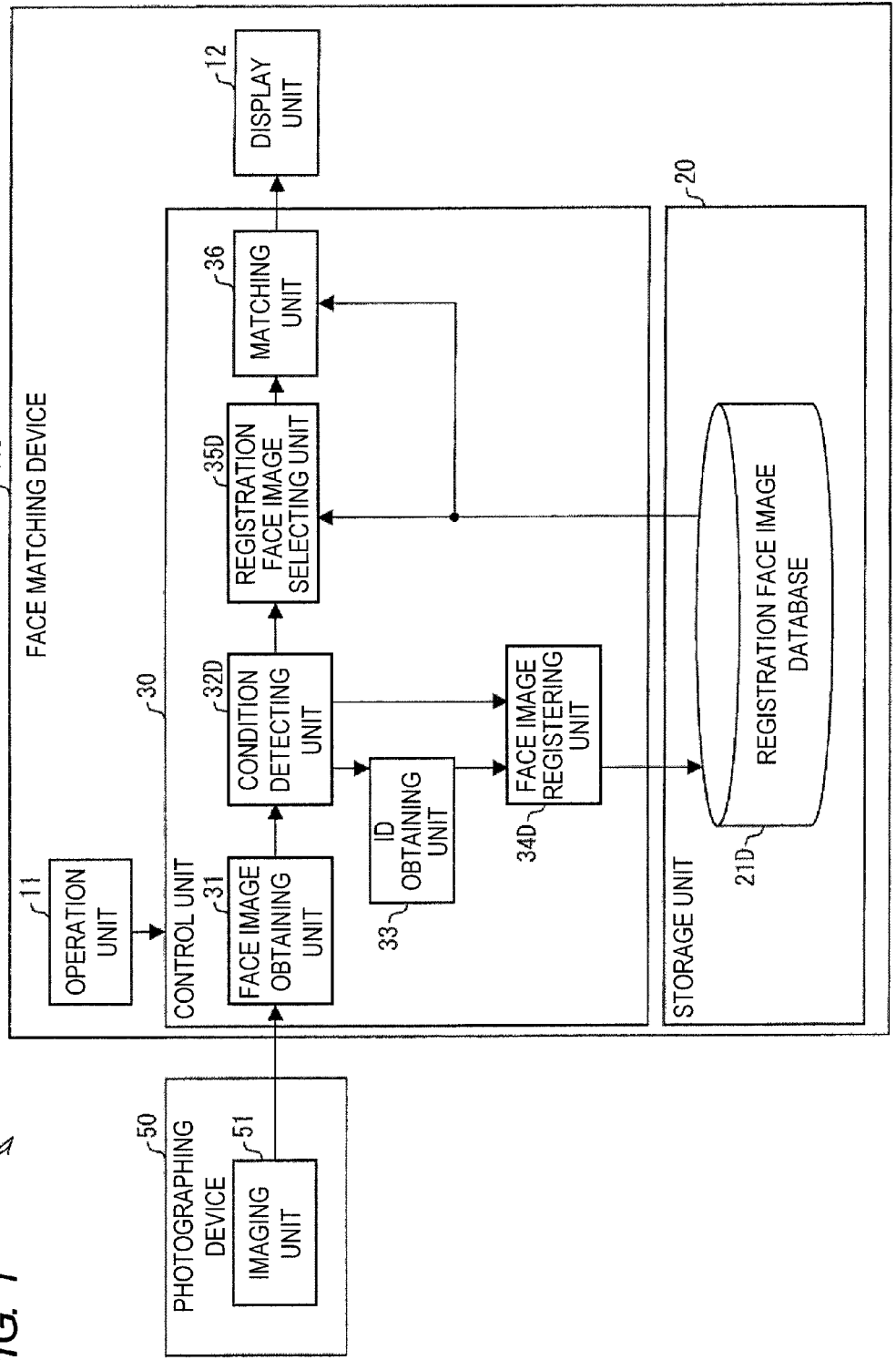
FIG. 1 is a functional block diagram illustrating a configuration example of a face matching device according to a first embodiment of the invention.

Referring to FIG. 1, a face matching system (the digital image processing system) 1 includes a face matching device (the matching device) 10 and a photographing device (image input device) 50.

The photographing device 50 includes an imaging unit 51 that photographs a subject to produce an image.

Specifically the imaging unit 51 includes an imaging lens, an imaging element, a frame memory, a mechanical mechanism, and a motor. For example, a CCD (Charge Coupled Device) and a CMOS (Complementary Metal Oxide Semiconductor) can be used as the imaging element.

For the sake of convenience, it is assumed that the imaging unit 51 photographs a person that is of the subject from a predetermined direction to produce a face image including a face of the person.

The face matching device 10 is connected to the photographing device 50 while being able to conduct communication with the photographing device 50, and the face matching device 10 can obtain the face image from the imaging unit 51 of the photographing device 50. Hereinafter the face image obtained from the imaging unit 51 is referred to as an "input face image".

The face matching device 10 includes an operation unit 11, a display unit 12, a storage unit 20, and a control unit 30.

The operation unit 11 receives various kinds of inputs from a user. The operation unit 11 includes input devices such as an input button, a keyboard, a numerical keypad, a pointing device such as a mouse, and a touch panel. The operation unit 11 produces operation data according to the operation received from the user to transmit the produced operation data to the control unit 30.

The display unit 12 performs screen display in order to provide information to the user. The display unit 12 displays various pieces of information such as characters and images to a display screen based on screen data received from the control unit 30. For example, the display unit 12 is formed by a display device such as an LCD (Liquid Crystal Display), a PDP (Plasma Display Panel), and an EL (Electro Luminescence) display.

Various pieces of data and programs are stored in the storage unit 20. For example, the storage unit 20 includes a nonvolatile storage device such as a hard disk, a ROM (Read Only Memory) that is of a read only semiconductor memory in which a program necessary to operate the control unit 30 and fixed data used for various kinds of control are stored, a RAM that is of a so-called working memory in which data used in calculation and calculation result are tentatively stored, and a rewritable nonvolatile memory (for example, flash memory) in which various pieces of setting data are stored. The storage unit 20 is described in detail later.

The control unit 30 performs overall control of various functions of the face matching device 10. The control function of the control unit 30 is realized such that a processing device such as a CPU (Central Processing Unit) executes a control program. For example, the control program may be stored in the storage unit 20 that is of a storage element such as a RAM (Random Access Memory) and a flash memory, or the control program may be used by reading the control program installed in the hard disk. The control unit 30 is described in detail later.

(Detailed Description of Storage Unit)

The storage unit 20 will be described in detail with reference to FIG. 1 and FIG. 2. As illustrated in FIG. 1, the storage unit 20 includes a registration face image database (the registration image database) 21 in which the face image is registered along with various pieces of data. The registration data registered in the registration face image database 21 will be described with reference to FIG. 2.

Figure 2:
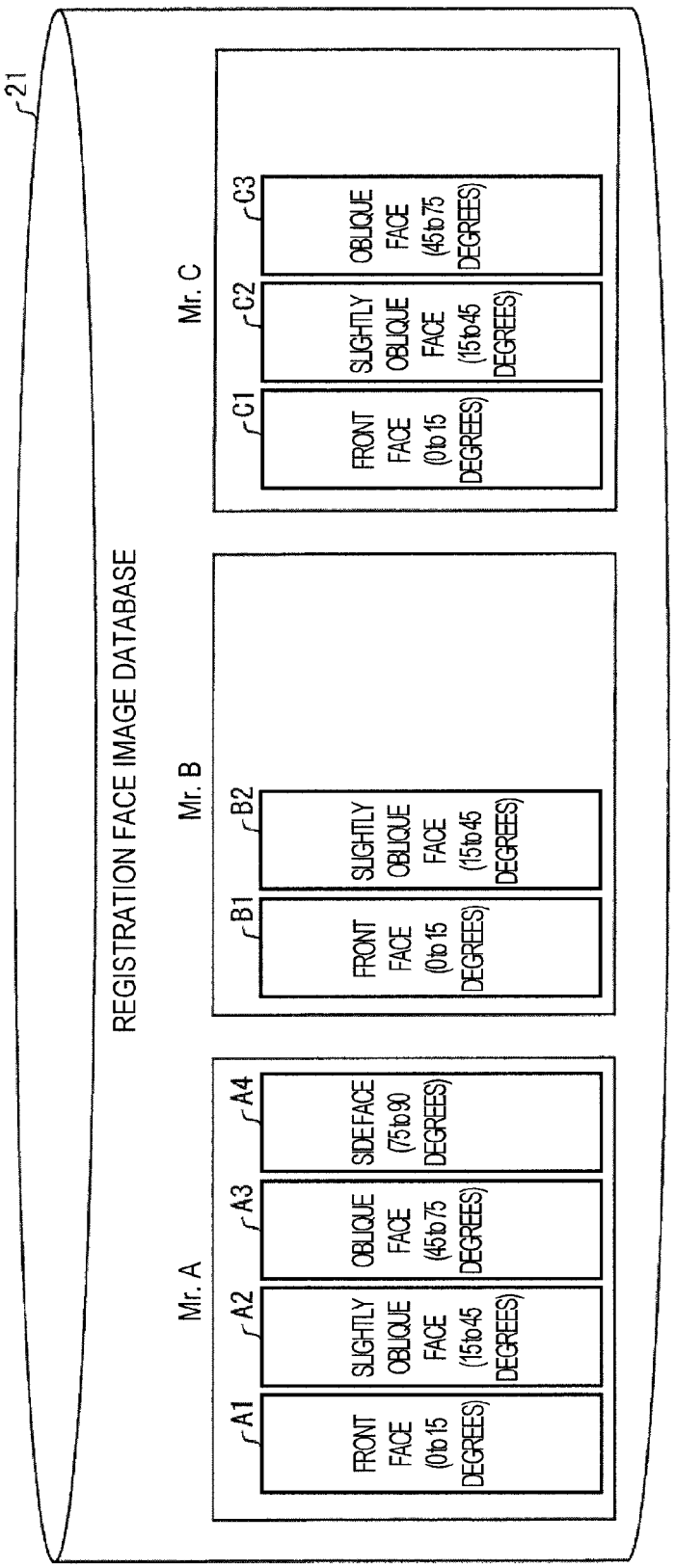
FIG. 2 is a view illustrating an example of registration data that is stored in a registration face image database included in the face matching device.

As illustrated in FIG. 2, a person is registered as registration data in the registration face image database 21 while a registration face image and a photographing condition (the registration condition) correspond to each other.

ID such as "Mr. A", "Mr. B", and "Mr. C" is provided to the registration person, thereby identifying an individual. This is only by way of example, and any ID can be used as the identification ID.

Hereinafter the registered face image, that is, the image in which the input face image obtained from the imaging unit 51 is registered in the registration face image database 21 is referred to as a "registration face image".

The photographing condition means information indicating a direction in which the imaging unit 51 photographs a person. The registration face image database 21 manages the direction in which the person is photographed while the direction is classified into four ranges of a "front face (0 to 15 degrees)", a "slightly oblique face (15 to 45 degrees)", an "oblique face (45 to 75 degrees)", and a "side face (75 to 90 degrees)".

More particularly, pieces of registration data "Mr. A", "Mr. B", and "Mr. C" are registered in the registration face image database 21 illustrated in FIG. 2.

Registration face images A1 to A4 are registered with respect to "Mr. A". The registration face image A1 corresponds to a photographing condition of "front face (0 to 15 degrees)". Photographing conditions "slightly oblique face (15 to 45 degrees)", "oblique face (45 to 75 degrees)", and "side face (75 to 90 degrees)" correspond to the registration face images A2, A3, and A4, respectively.

A registration face image B1 is registered with respect to "Mr. B" while corresponding to the photographing condition "front face (0 to 15 degrees)", and a registration face image B2 is also registered with respect to "Mr. B" while corresponding to the photographing condition "slightly oblique face (15 to 45 degrees)".

Similarly, registration face images C1, C2, and C3 are registered with respect to "Mr. C" while corresponding to the photographing condition "front face (0 to 15 degrees)", the "slightly oblique face (15 to 45 degrees)", and the "oblique face (45 to 75 degrees)".

(Detailed Description of Control Unit)

The control unit 30 will be described in detail with reference to FIG. 1. As illustrated in FIG. 1, the control unit 30 includes a face image obtaining unit 31, a condition detecting unit (the condition detecting means) 32, an ID obtaining unit 33, a face image registering unit 34, a registration face image selecting unit (the condition determination means and the condition specifying means) 35, and a matching unit (the matching means) 36.

Processing performed in the control unit 30 is roughly divided into "registration processing" and "matching processing".

The "registration processing" is performed by the face image obtaining unit 31, the condition detecting unit 32, the ID obtaining unit 33, and the face image registering unit 34 in the control unit 30.

The "matching processing" is performed by the face image obtaining unit 31, the condition detecting unit 32, the registration face image selecting unit 35, and the matching unit 36 in the control unit 30.

The face image obtaining unit 31 obtains the input face image from the imaging unit 51 in response to the input operation of the operation unit 11. The face image obtaining unit 31 transfers the obtained input face image to the condition detecting unit 32.

The condition detecting unit 32 analyzes the input face image, and the condition detecting unit 32 detects a photographing condition when the subject is photographed. For example, the condition detecting unit 32 detects the direction in which the person included in the input face image is photographed.

At this point, the condition detecting unit 32 detects the four ranges of the "front face (0 to 15 degrees)", the "slightly oblique face (15 to 45 degrees)", the "oblique face (45 to 75 degrees)", and the "side face (75 to 90 degrees)" as the direction in which the person is photographed.

During registration processing, the condition detecting unit 32 transmits the input face image and the photographing condition obtained by analyzing the input face image to the face image registering unit 34. During matching processing, the condition detecting unit 32 transmits the input face image and the photographing condition (detection condition) obtained by analyzing the input face image to the registration face image selecting unit 35.

The ID obtaining unit 33 obtains ID in order to identify a person registered in the registration face image database 21. The ID obtaining unit 33 transmits the ID input in the operation unit 11 to the face image registering unit 34. Any ID such as a name and a nickname of the person can be used.

The face image registering unit 34 registers the face image in the registration face image database 21. During the registration processing, the face image registering unit 34 provides the ID transmitted from the ID obtaining unit 33 to the input face image and photographing condition transmitted from the condition detecting unit 32, and the face image registering unit 34 registers them in the registration face image database 21.

During the matching processing, the registration face image selecting unit 35 selects the registration face image that should be used in the matching from plural registration face images registered with respect to each person. More specifically, the registration face image selecting unit 35 selects the photographing condition, which is registered common to persons and is closest to the photographing condition transmitted from the condition detecting unit 32.

As used herein, the closeness of the photographing condition means a degree of similarity of the direction in which the person is photographed. For example, the photographing condition of the "front face (0 to 15 degrees)" is closer to the photographing condition of the "slightly oblique face (15 to 45 degrees)" than the photographing condition of the "oblique face (45 to 75 degrees)". The photographing condition of the "front face (0 to 15 degrees)" is closer to the photographing condition of the "oblique face (45 to 75 degrees)" than the photographing condition of the "side face (75 to 90 degrees)".

The matching unit 36 performs the matching processing of the input face image using the registration face images that are selected with respect to the persons by the registration face image selecting unit 35. More specifically, the matching unit 36 obtains the degree of similarity between the selected registration face image and the input face image, and the matching unit 36 outputs the ID of the registration face image having the highest degree of similarity to the display unit 12.

(Registration Processing Flow)

Figure 3:
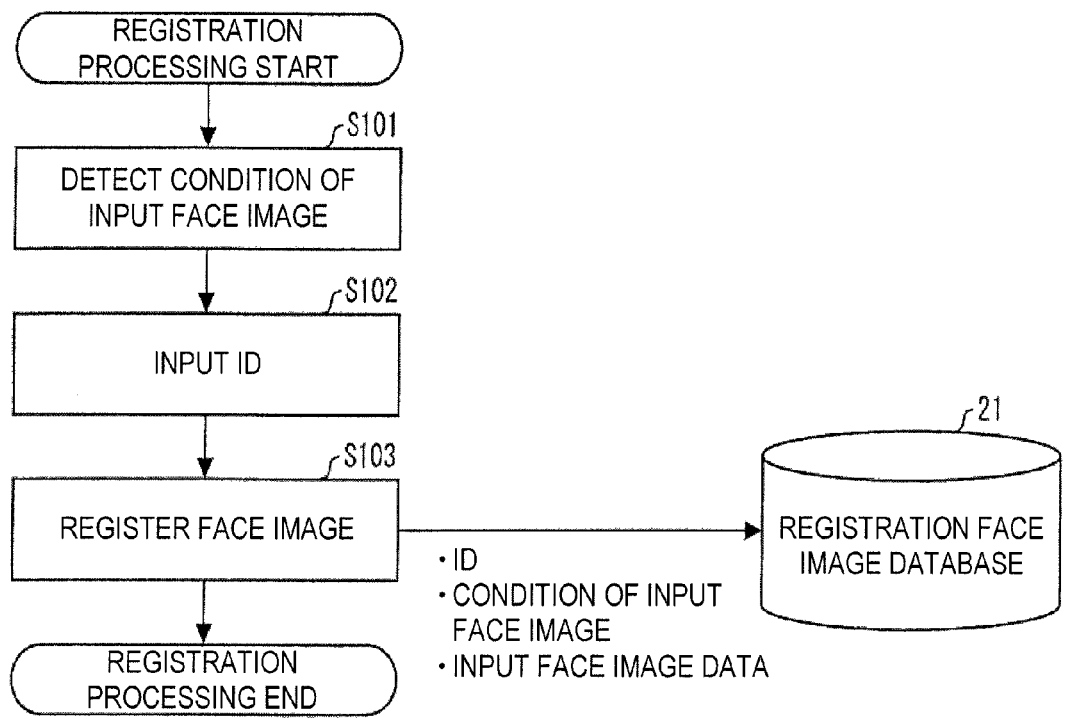
FIG. 3 is a flowchart illustrating an example of a registration processing flow in the face matching device.

A registration processing flow in the face matching device 10 will be described with reference to FIG. 3. FIG. 3 is a flowchart illustrating an example of the registration processing flow.

The condition detecting unit 32 analyzes the input face image obtained from the face image obtaining unit 31, and detects the photographing condition of the input face image (S101).

The ID obtaining unit 33 obtains the ID input from the operation unit 11 (S102).

The face image registering unit 34 registers the ID, the input face image, and the photographing condition in the registration face image database 21 while the ID, the input face image, and the photographing condition correspond to one another (S103).

(Matching Processing Flow)

Figure 4:
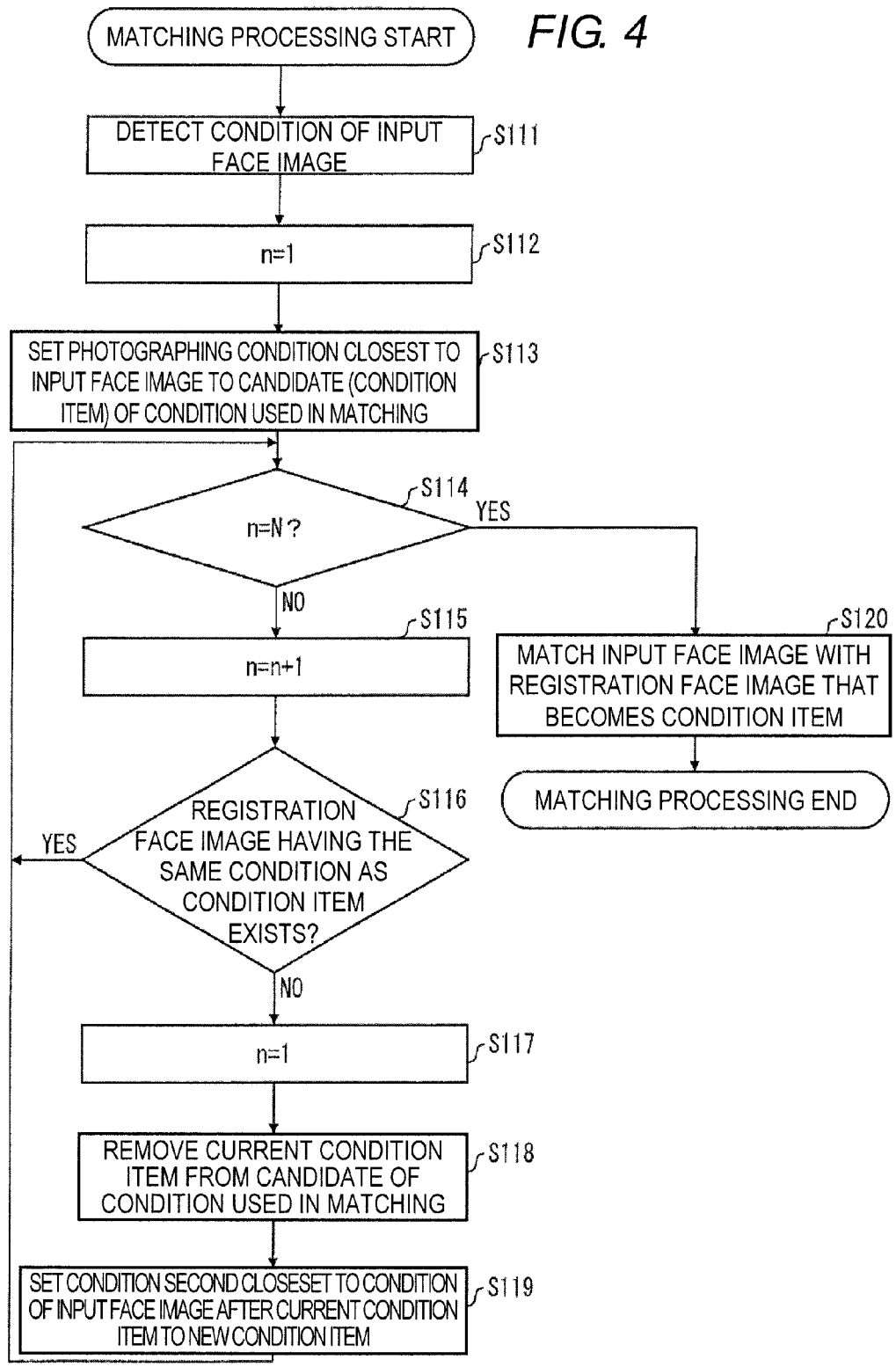
FIG. 4 is a flowchart illustrating an example of a matching processing flow in the face matching device.

A matching processing flow in the face matching device 10 will be described with reference to FIG. 4. FIG. 4 is a flowchart illustrating an example of the matching processing flow.

The condition detecting unit 32 analyzes the input face image obtained from the face image obtaining unit 31, and the condition detecting unit 32 detects the photographing condition of the input face image (S111).

The registration face image selecting unit 35 sets a registration person variable n to 1 (S112). The registration person variable n is used to designate the registration person. A serial number, for example, a number of the order of registration is allocated to the ID of the registration person. When N persons are registered in the registration face image database 21, 1, 2, 3, . . . , and N are allocated to the persons. That is, the registration person variable n is one that designates the nth person in the first to nth registration persons.

The registration face image selecting unit 35 sets the photographing condition that is closest to the photographing condition of the input face image in the registered photographing conditions to a candidate (hereinafter referred to as condition item) of condition used in the matching with respect to the nth (n=1) person (S113).

The registration face image selecting unit 35 determines whether the registration person variable n is equal to N (S114). At this point, the registration face image selecting unit 35 determines an ending condition when the registration face image is selected. When the registration person variable n is not equal to N (NO in S114), because the photographing condition that is common to the photographing condition and closest to the photographing condition of the input face image is not selected yet with respect to the N persons, the registration face image selecting unit 35 increments the registration person variable n by 1 (S115), and determines whether the same photographing condition as the current condition item is registered with respect to the nth person (S116).

When the same photographing condition as the condition item is registered with respect to the nth person (YES in S116), the flow returns to S114. A loop of S114 to S116 is used to determine whether the same photographing condition as the condition item is registered with respect to the nth person, and the photographing conditions are repeatedly determined in order up to the Nth person in the loop.

On the other hand, when the same photographing condition as the condition item is not registered with respect to the nth person (NO in S116), the registration face image selecting unit 35 sets the registration person variable n to 1 (S117), and removes the current condition item from the candidate of the condition used in the matching (S118). This is because the condition item is not the photographing condition registered common to the persons when the same photographing condition as the current condition item is not registered with respect to the nth person.

The registration face image selecting unit 35 sets a condition that is second closest to the photographing condition of the input face image after the current condition item to a new condition item (S119), and the flow returns to S114.

When the registration face image selecting unit 35 selects the photographing condition common to the persons by repeating the loop until the registration person variable n becomes N (YES in S114), the matching unit 36 performs the matching of the input face image based on the registration face image that corresponds to the obtained photographing condition (S120).

Thus, in the matching processing, after the selection process of selecting the registration face image used in S120, the matching process of matching the input face image is performed using the selected registration face image in S120.

(Specific Example)

Figure 5:
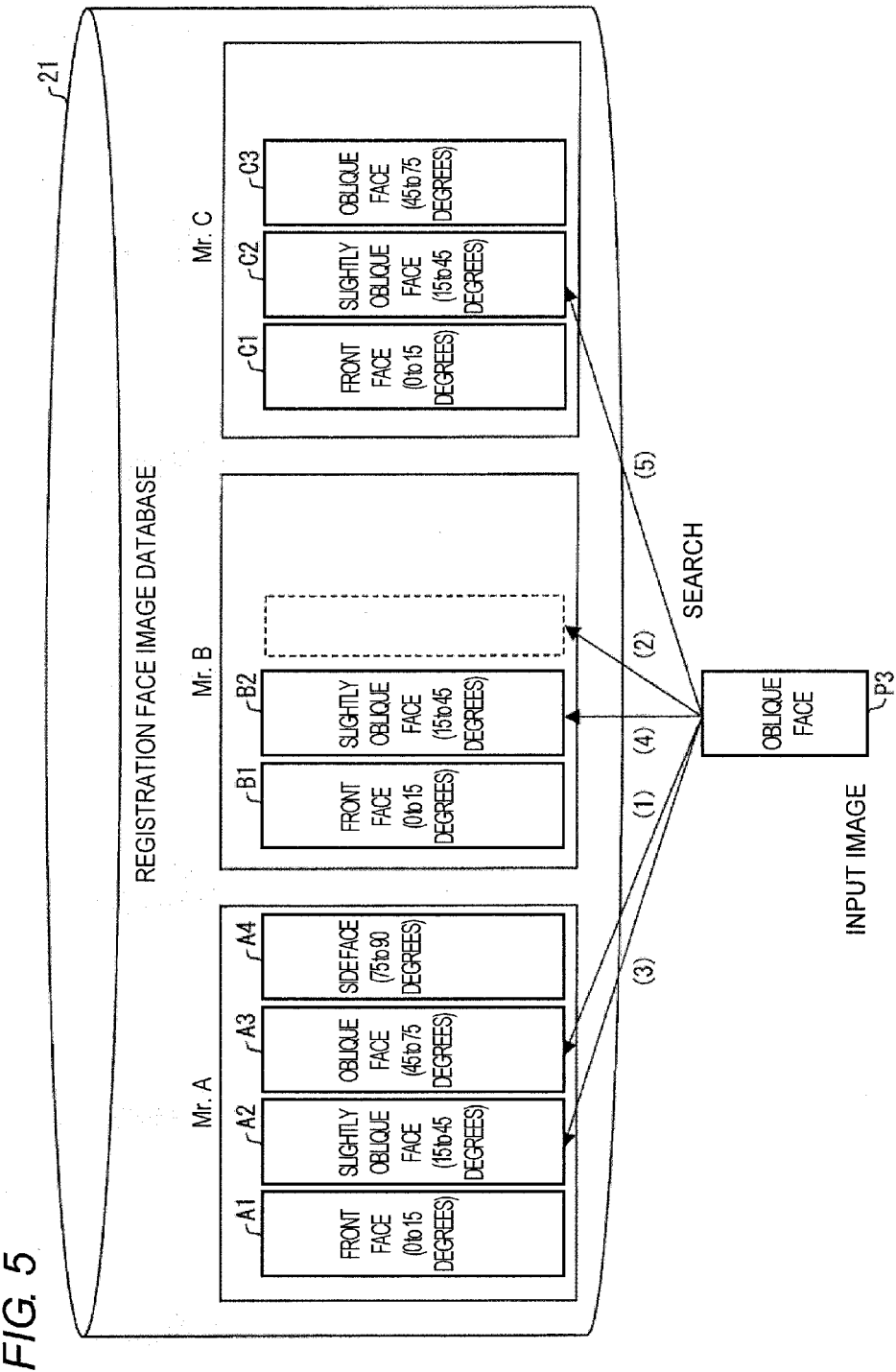
FIG. 5 is a view illustrating a specific example of matching processing in the face matching device.

A specific example of the matching processing will be described below with reference to FIG. 5. FIG. 5 is a view illustrating the matching processing in which an input face image P3 whose photographing condition is the "oblique face (45 to 75 degrees)" is input when the registration data illustrated in FIG. 2 is registered in the registration face image database 21. (1) The registration face image selecting unit 35 detects the registration face image A3 that corresponds to the photographing condition closest to the photographing condition of the "oblique face (45 to 75 degrees)" of the input face image P3 with respect to "Mr. A".

(2) Then the registration face image selecting unit 35 searches the registration face image that corresponds to the photographing condition of the "oblique face (45 to 75 degrees)" with respect to "Mr. B". However, such registration face image does not exist. (3) Therefore, the registration face image selecting unit 35 detects the registration face image A2 that corresponds to the photographing condition of the "slightly oblique face (15 to 45 degrees)" second closest to the photographing condition of the "oblique face (45 to 75 degrees)" of the input face image P3 after the photographing condition of the registration face image A3 with respect to "Mr. A".

(4) The registration face image selecting unit 35 detects the registration face image B2 that corresponds to the photographing condition of the "slightly oblique face (15 to 45 degrees)" with respect to "Mr. B". (5) The registration face image selecting unit 35 detects the registration face image C2 that corresponds to the photographing condition of the "slightly oblique face (15 to 45 degrees)" with respect to "Mr. C".

The registration face image selecting unit 35 selects the registration face images A2, B2, and C2 that correspond to the photographing condition of the "slightly oblique face (15 to 45 degrees)" with respect to "Mr. A", "Mr. B", and "Mr. C" through the matching processing, respectively. The matching unit 36 performs the matching of the input face image P3 based on the registration face images A2, B2, and C2 selected by the registration face image selecting unit 35.

As described above, the face matching device 10 specifies the person included in the input face image by matching the input face image in which the face of the person is photographed with the registration face image database 21, in which the registration face image obtained by photographing the face of the person in each person is registered. In the face matching device 10, the registration face image and the photographing condition in which the person included in the registration face image is photographed are registered in the registration face image database 21 while the registration face image and the photographing condition correspond to each other. The face matching device 10 includes a condition detecting unit 32, the registration face image selecting unit 35, and the matching unit 36. The condition detecting unit 32 detects the photographing condition in which the person included in the registration face image is photographed. The registration face image selecting unit 35 determines the closeness of the photographing condition of the registration face image and the photographing condition detected from the input face image, and selects the photographing condition closest to the photographing condition detected from the input face image in the photographing conditions of the registration face images registered common to the persons based on the closeness of the determined photographing condition.

The matching unit 36 performs the matching using the registration face image that corresponds to the selected photographing condition.

Therefore, advantageously the high-accuracy matching result is obtained even if the input face image differs from the registration face image in the photographing condition.

(Modification)

Various modifications of the first embodiment will be described below.

In the first embodiment, the face matching device performs the matching of the face image of the person. However, the matching target is not limited to the person. A matching device can be configured such that not only the person but also an object are registered as the registration image in the registration image database and such that the object included in the input image is matched with the registration image database.

In the first embodiment, the face image obtaining unit 31 obtains the face image from the imaging unit 51. However, the face image obtaining unit 31 is not limited to the first embodiment. A communication unit (not illustrated) that conducts communication with the outside is provided in the face matching device 10 to enable the face matching device 10 to be connected to a network, and the face image obtaining unit 31 may obtain the face image from the outside through the network.

An external recording medium reading unit (not illustrated) is provided in the face matching device 10, the external recording medium reading unit reads the face image recorded in an external recording medium, and the face image obtaining unit 31 may obtain the face image from the external recording medium reading unit.

It is not always necessary that the face matching device 10 include the registration face image database 21, but an external server device may include the registration face image database 21. The face matching device 10 may access the external server device including the registration face image database 21 through a communication network during the registration processing and matching processing.

In the first embodiment, for the purpose of simple description, the information indicating the direction in which the person is photographed is used as the photographing condition. However, the information is not limited to the first embodiment. The lighting, the face orientation, a facial expression, an age, a makeup method, the presence or absence of a wearing object, a hair pattern, image solution, and other factors used to determine a feature amount of the face can be used as the photographing condition.

That is, the photographing condition includes not only condition settings regarding the photographing environment such as the angle and orientation with respect to the subject and the lighting, but also the conditions regarding an appearance of the subject person.

Second Embodiment

A face matching device according to a second embodiment of the invention will be described below with reference to FIG. 6 to FIG. 9. For the sake of convenience, the component having the same function as that of the first embodiment is designated by the same numeral, and the description is omitted.

A face matching device (the matching device) 10A of the second embodiment will be described with reference to FIG. 6. In the face matching device 10A, the photographing condition of the registration face image used in the matching processing is previously selected until the matching processing after the registration processing, thereby removing the selection process in the matching processing to achieve speed enhancement and load reduction of the processing.

In other words, in the face matching device 10A, the "selection process" performed in the "matching processing" by the face matching device 10 of the first embodiment is independently performed by "preliminarily-selecting processing".

Because the registration processing in the face matching device 10A is similar to that of the face matching device 10, the description is omitted.

(Detailed Configuration)

Figure 6:
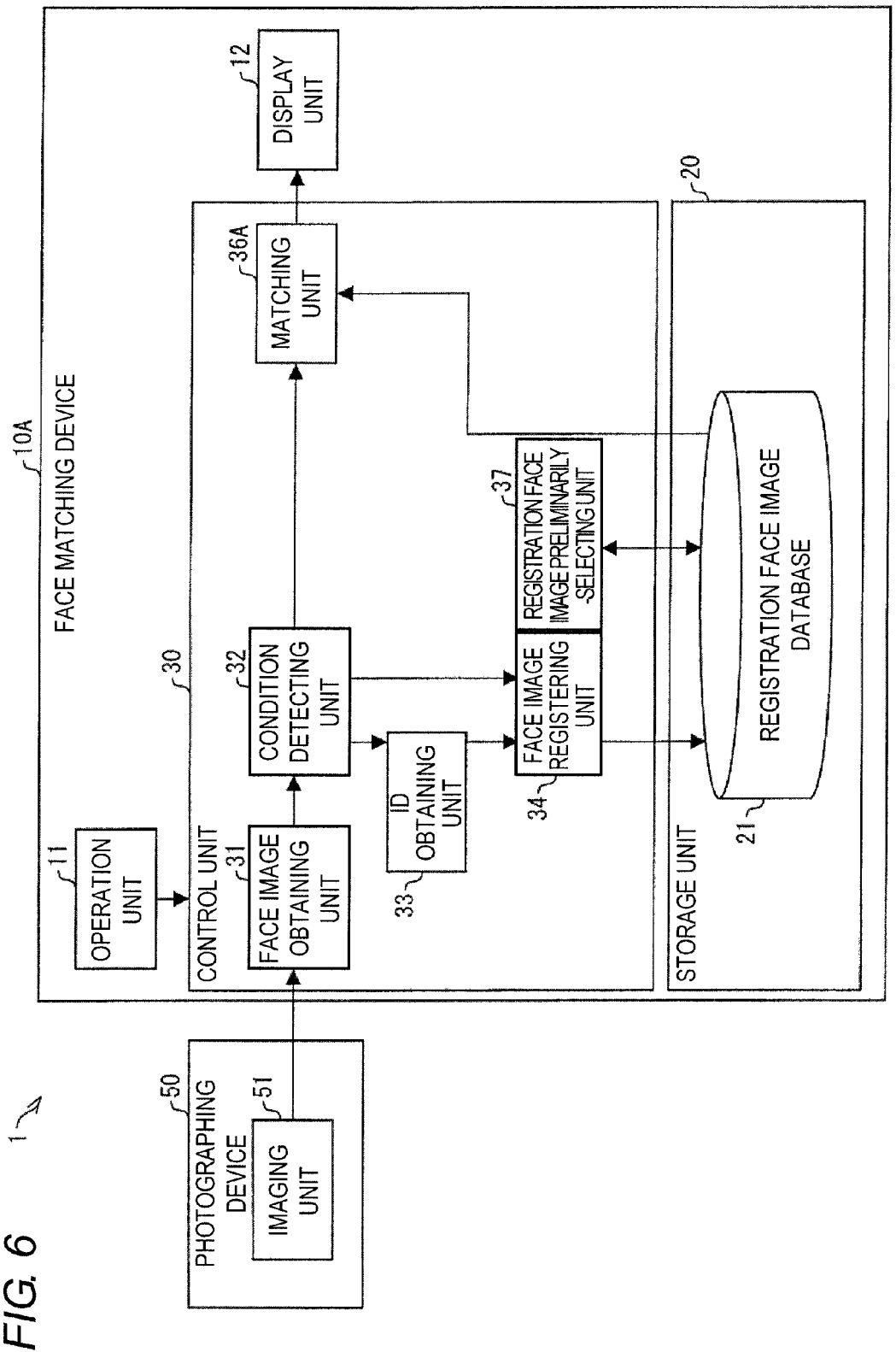
FIG. 6 is a functional block diagram illustrating a configuration example of a face matching device according to another embodiment of the invention.

As illustrated in FIG. 6, in the face matching device 10A, the registration face image selecting unit 35 and matching unit 36 of the face matching device 10 illustrated in FIG. 1 are replaced with a registration face image preliminarily-selecting unit (the selection means) 37 and a matching unit (the matching means) 36A, respectively.

The condition detecting unit 32 is configured to transmit the input face image and the photographing condition to the matching unit 36A during the matching processing in association with the configuration changes.

The registration face image preliminarily-selecting unit 37 refers to the registration face image database 21 to previously confirm the photographing condition registered common to the persons, and previously selects the photographing condition of the registration face image used in the matching processing. When selecting the photographing condition of the registration face image used in the matching processing, the registration face image preliminarily-selecting unit 37 provides "already-registered information" indicating that the registration face image is selected to the selected photographing condition to update the registration face image database 21.

During the matching processing, the matching unit 36A performs the matching processing using the selected registration face image. That is, the matching unit 36 performs the matching processing to the registration face image selected by the registration face image selecting unit 35, while the matching unit 36A refers to the registration face image database 21 to perform the matching processing to the photographing condition to which the "already-registered information" is provided. In the matching unit 36A, the same technique as the matching unit 36 can be adopted in the determination of the degree of similarity during the matching processing.

(Preliminarily-Selecting Processing Flow)

Figure 7:
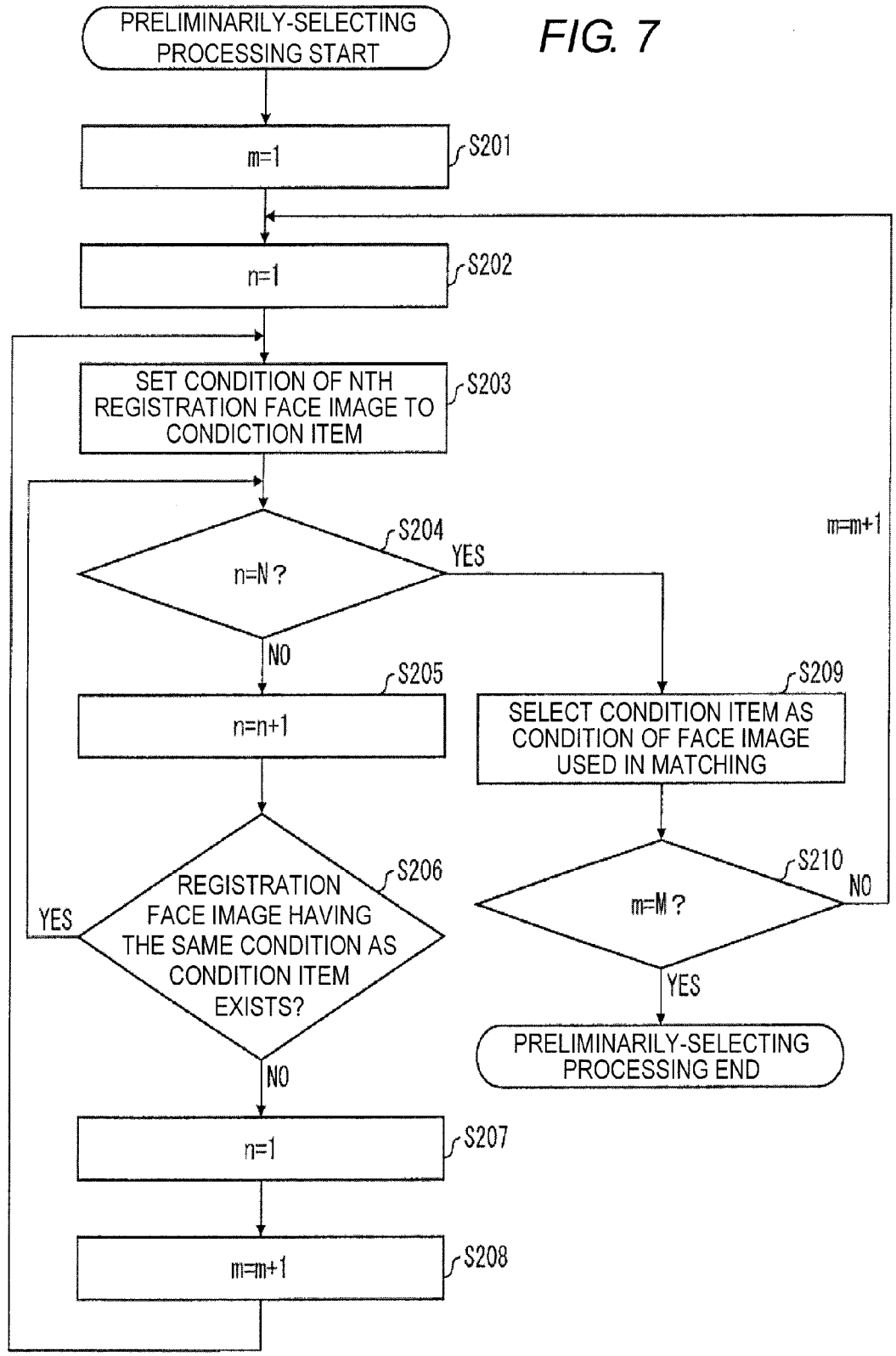
FIG. 7 is a flowchart illustrating an example of a preliminarily-selecting processing flow in the face matching device.

A preliminarily-selecting processing flow of the face matching device 10A will be described below with reference to FIG. 7. FIG. 7 is a flowchart illustrating an example of the preliminarily-selecting processing flow.

The registration face image preliminarily-selecting unit 37 sets a photographing condition variable m to 1 (S201). The photographing condition variable m is used to designate the photographing condition. The photographing condition variable m is more specifically described as follows.

A serial number (for example, what number the photographing condition of the person is registered) is allocated to a photographing condition of a registration face image of a certain person. When M registration face images are registered in the registration face image database 21 with respect to a certain person, 1, 2, 3, . . . , and M are allocated to the photographing conditions corresponding to the registration face images. The photographing condition variable m is used to designate the mth photographing condition.

Then the registration face image preliminarily-selecting unit 37 sets the registration person variable n to 1 (S202). At this point, the registration face image preliminarily-selecting unit 37 sets the photographing condition of the nth registration face image to the condition item (S203).

The registration face image preliminarily-selecting unit 37 determines whether the registration person variable n is equal to N (S204). At this point, the registration face image preliminarily-selecting unit 37 confirms whether the mth photographing condition is included in the Nth person.

When the registration person variable n is not equal to N (NO in S204), the registration face image preliminarily-selecting unit 37 increments the registration person variable n by 1 (S205), and determines whether the same photographing condition as the current condition item is registered with respect to the nth person (S206).

When the same photographing condition as the current condition item is registered with respect to the nth person (YES in S206), the flow returns to S204. That is, a loop of S204 to S206 is used to determine whether the same photographing condition as the condition item is registered with respect to the nth person, and the photographing condition is repeatedly determined in order up to the Nth person.

On the other hand, when the same photographing condition as the current condition item is not registered with respect to the nth person (NO in S206), the registration face image preliminarily-selecting unit 37 sets the registration person variable n to 1 (S207), and increments the photographing condition variable m by 1 (S208). In such cases, because the current condition item is not the photographing condition common to the persons, the photographing condition variable m is incremented in order to designate the next photographing condition.

The flow returns to S203, and the registration face image preliminarily-selecting unit 37 sets the condition of the mth registration face image to the condition item with respect to the incremented photographing condition variable m to continuously perform the processing.

When the loop of S203 to S208 is repeated with respect to the mth photographing condition to obtain the photographing condition common to the persons until the registration person variable n is equal to N (YES in S204), the registration face image preliminarily-selecting unit 37 selects the current condition item as the photographing condition used in the matching (S209). That is, the registration face image preliminarily-selecting unit 37 provides the "already-selected information" to the selected photographing condition to update the registration face image database 21 with respect to each person.

The registration face image preliminarily-selecting unit 37 determines whether the photographing condition variable m is equal to M (S210). When the photographing condition variable m is not equal to M (NO in S210), because the photographing condition whose selection is not determined yet exists, the flow returns to S202 to continue the processing. On the other hand, when the photographing condition variable m is equal to M (YES in S210), the preliminarily-selecting processing is ended.

(Matching Processing Flow)

Figure 8:
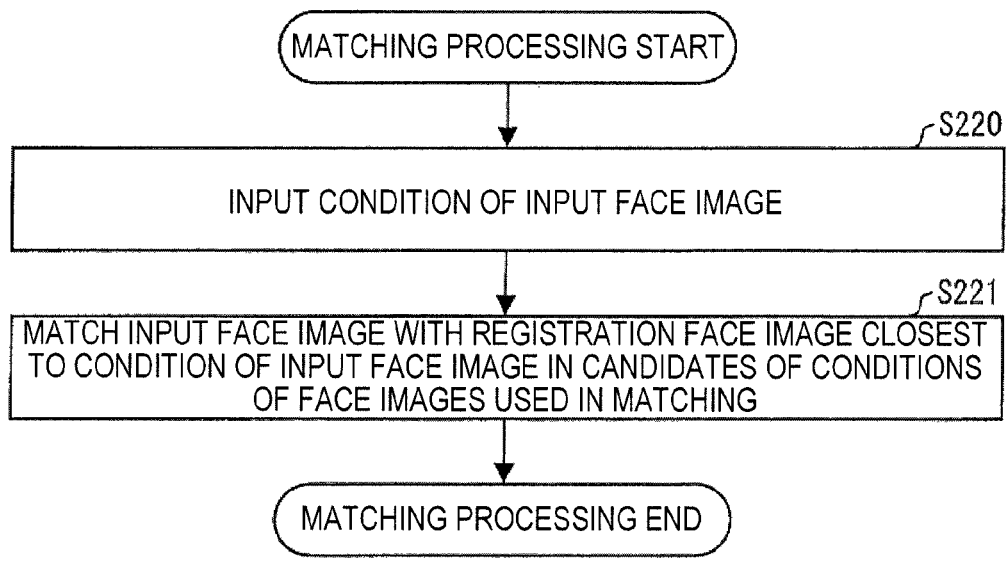
FIG. 8 is a flowchart illustrating an example of a registration processing flow in the face matching device.

A matching processing flow in the matching unit 36A will be described below with reference to FIG. 8. FIG. 8 is a flowchart illustrating an example of the matching processing flow.

The condition detecting unit 32 analyzes the input face image obtained from the face image obtaining unit 31, and detects the photographing condition of the input face image (S220).

The matching unit 36A refers to the registration face image database 21 to obtain the registration face image that is the photographing condition to which the "already-selected information" is provided and corresponds to the photographing condition closest to the detected photographing condition with respect to each registration person, and the matching unit 36A performs the matching of the input face image based on the obtained registration face image (S221).

(Specific Example)

Figure 9:
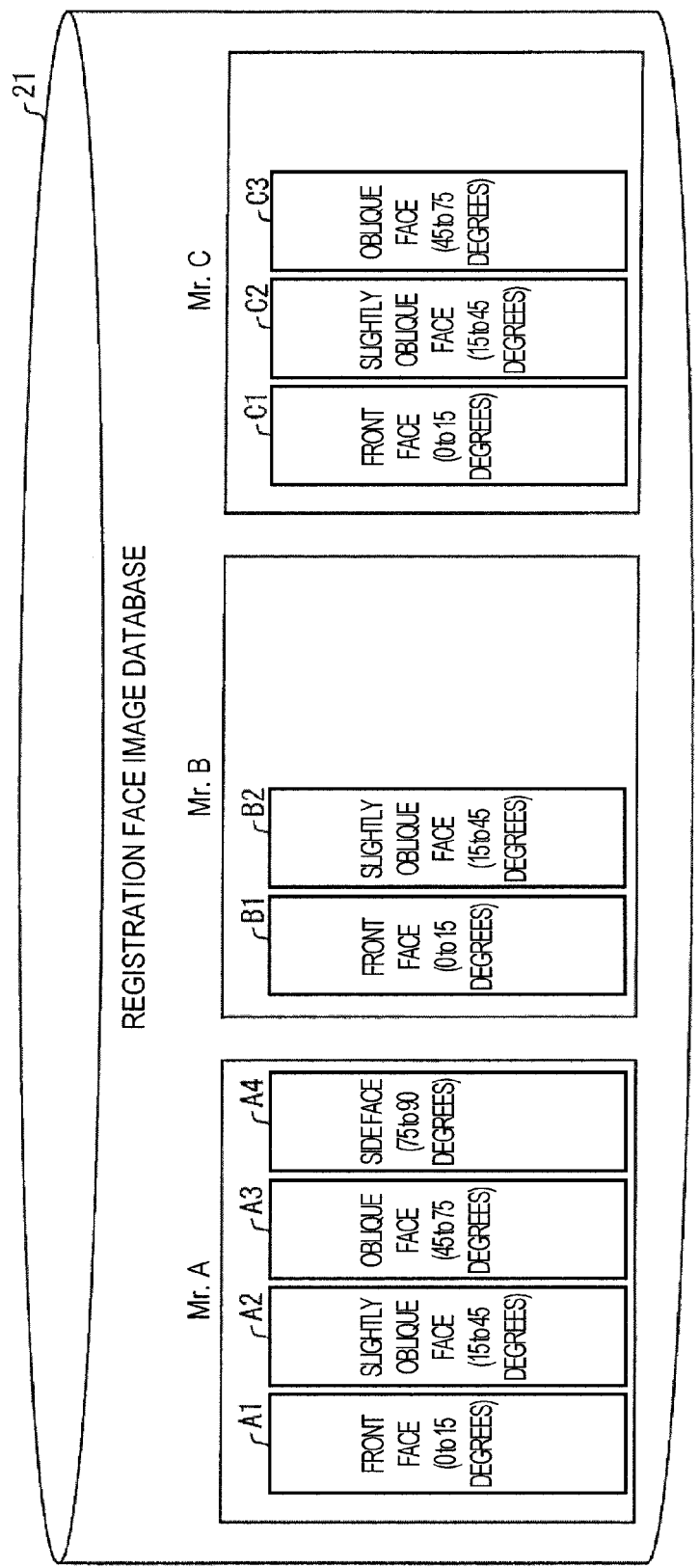
FIG. 9 is a view illustrating specific examples of preliminarily-selecting processing and matching processing in the face matching device.

Specific examples of the preliminarily-selecting processing and matching processing will be described below with reference to FIG. 9. FIG. 9 is a flowchart illustrating a preliminarily-select example when the registration data illustrated in FIG. 2 is stored in the registration face image database 21.

In the registration face image database 21 illustrated in FIG. 9, the photographing condition of the "front face (0 to 15 degrees)" and the photographing condition of the "slightly oblique face (15 to 45 degrees)" are registered with respect to each of the persons Mr. A, Mr. B, and Mr. C.

Accordingly, the pieces of "already-selected information" are provided to the registration face images A1 and A2 of Mr. A, the registration face images B1 and B2 of Mr. B, and the registration face images C1 and C2 of Mr. C through the preliminarily-selecting processing. In FIG. 9, the pieces of "already-selected information" are provided to the photographing conditions of the registration face images A1, A2, B1, B2, C1, and C2, whereby the registration face images A1, A2, B1, B2, C1, and C2 are preliminarily selected.

On the other hand, the photographing condition of the "oblique face (45 to 75 degrees)" of the registration face image A3 and the photographing condition of the "side face (75 to 90 degrees)" of the registration face image A4 are not selected with respect to Mr. A. The photographing condition of the "oblique face (45 to 75 degrees)" of the registration face image C3 is not selected with respect to Mr. C. This is because the photographing condition of the "oblique face (45 to 75 degrees)" of the registration face image A3, the photographing condition of the "side face (75 to 90 degrees)" of the registration face image A4, and the photographing condition of the "oblique face (45 to 75 degrees)" of the registration face image C3 are not the photographing condition registered common to the persons.

The registration face images A1, B1, and C1 that correspond to the photographing condition of the "front face (0 to 15 degrees)" to which the pieces of "already-selected information" are provided or the registration face images A2, B2, and C2 that correspond to the photographing condition of the "slightly oblique face (15 to 45 degrees)" are used in the matching processing.

For example, when the photographing condition of the input face image is the "front face (0 to 15 degrees)", the registration face images A1, B1, and C1 in which the photographing conditions are matched with one another is used in the matching processing.

Third Embodiment

A face matching device according to a third embodiment of the invention will be described with reference to FIG. 10 to FIG. 14. For the sake of convenience, the component having the same function as that of the first and second embodiments is designated by the same numeral, and the description is omitted.

A face matching device (the matching device) 10B of the third embodiment will be described with reference to FIG. 10. In the face matching device 10B, a flag used to specify the photographing condition of the registration face image is set in the registration processing in order to use the matching processing, and the matching processing is performed based on the flag, thereby achieving the speed enhancement and the load reduction in the matching processing.

(Detailed Configuration)

Figure 10:
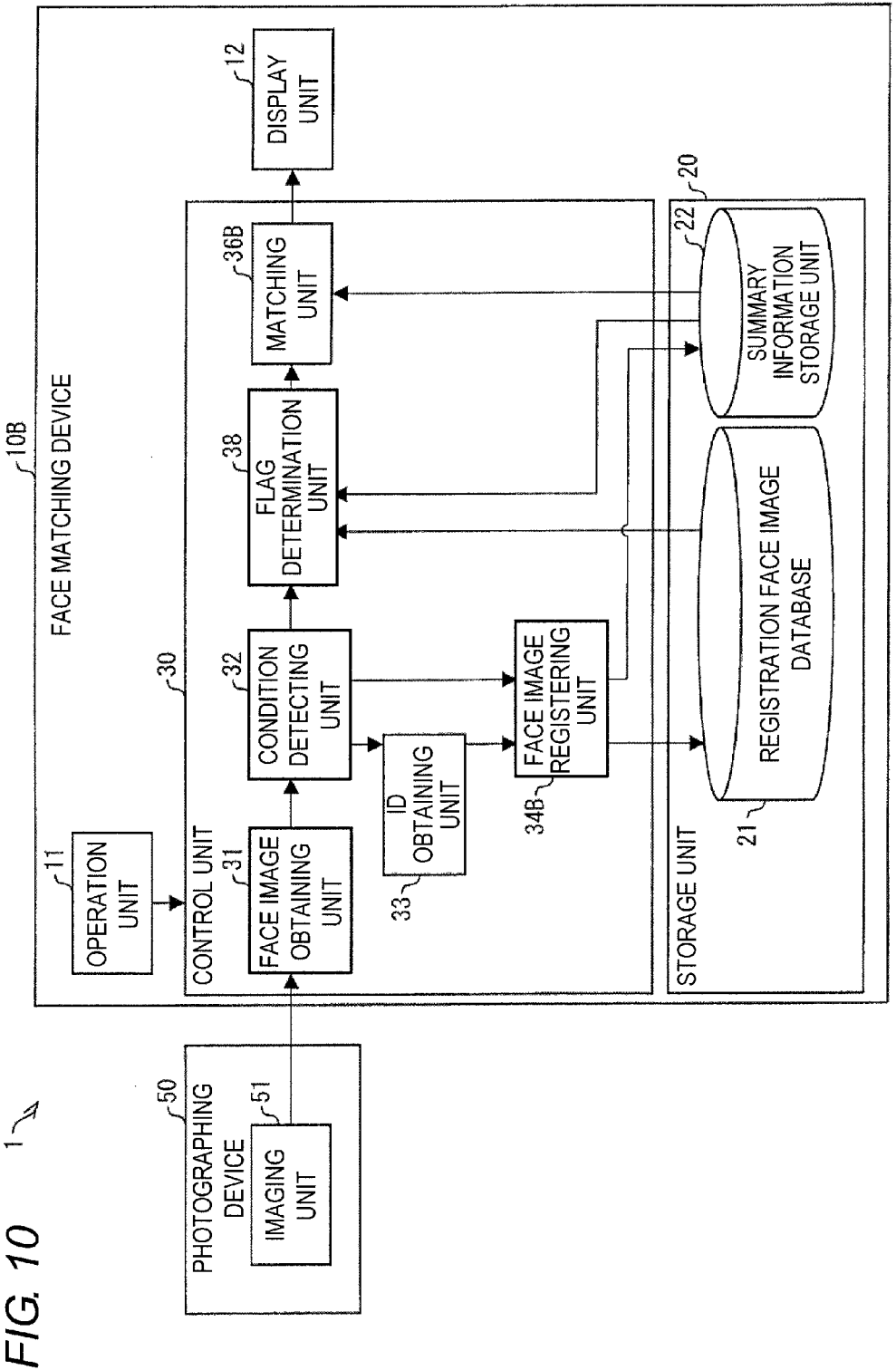
FIG. 10 is a functional block diagram illustrating a configuration example of a face matching device according to a still another embodiment of the invention.

As illustrated in FIG. 10, in the face matching device 10B, the face image registering unit 34 and matching unit 36 of the face matching device 10 illustrated in FIG. 1 are replaced with a face image registering unit (the summary means) 34B and a matching unit (condition specifying means and matching means) 36B, respectively, and a flag determination unit (the condition determination means) 38 and a summary information storage unit 22 are added.

The condition detecting unit 32 is configured to transmit the photographing condition to the flag determination unit 38 during the matching processing in association with the configuration changes.

The number of registered persons of the pieces of registration data registered in the registration face image database 21 and summary information in which the number of flags, which are set while corresponding to the photographing condition, is summarized are stored in the summary information storage unit 22.

In registering the registration face image, the face image registering unit 34B sets the flag according to the photographing condition of the registration face image to register the flag in the registration face image database 21. The face image registering unit 34B refers to the registration face image database 21 to summarize the flags to store the summary result in the summary information storage unit 22.

The flag according to the photographing condition means an identifier that can uniquely specify the photographing condition.

During the matching processing, the flag determination unit 38 refers to the summary information storage unit 22 to determine the summary result of the flag, thereby selecting the candidate of the registration face image used in the matching. The flag determination unit 38 transmits the determination result of the flag to the matching unit 36B.

The matching unit 36B performs the matching processing of the input face image using the candidate of the registration face image selected by the flag determination unit 38.

(Registration Processing Flow)

Figure 11:
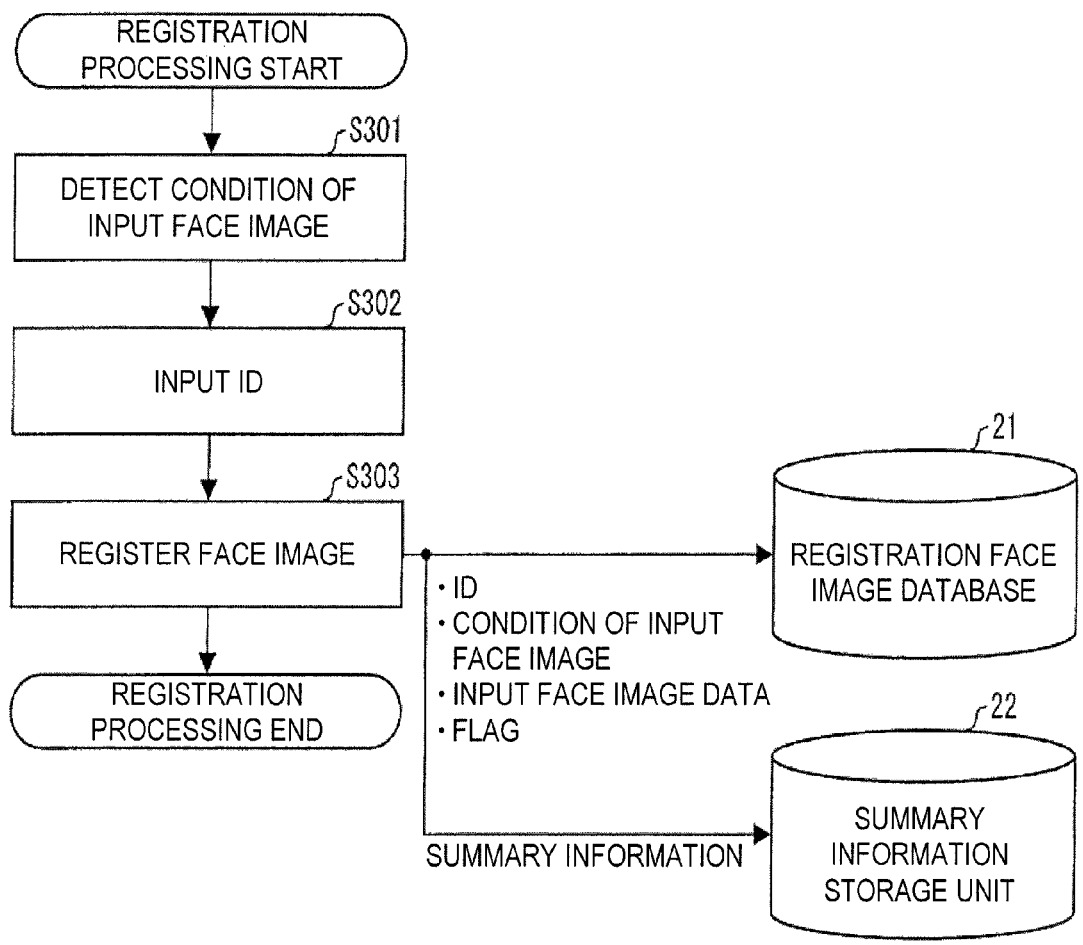
FIG. 11 is a flowchart illustrating an example of a registration processing flow in the face matching device.

A registration processing flow in the face matching device 10B will be described below with reference to FIG. 11. FIG. 11 is a flowchart illustrating an example of the registration processing flow.

The condition detecting unit 32 analyzes the input face image obtained from the face image obtaining unit 31, and detects the photographing condition of the input face image (S301).

The ID obtaining unit 33 obtains the ID input from the operation unit 11 (S302).

The face image registering unit 34B sets the flag according to the photographing condition to the photographing condition, and registers the ID, the input face image, the photographing condition, and the flag in the registration face image database 21 while the ID, the input face image, the photographing condition, and the ID correspond to one another (S303). After the face image is registered, the face image registering unit 34B refers to the registration face image database 21 to summarize the number of flags that are set while corresponding to the number of registration persons of the pieces of registration data and the photographing condition, and then stores the summary result as the summary information in the summary information storage unit 22.

(Matching Processing Flow)

Figure 12:
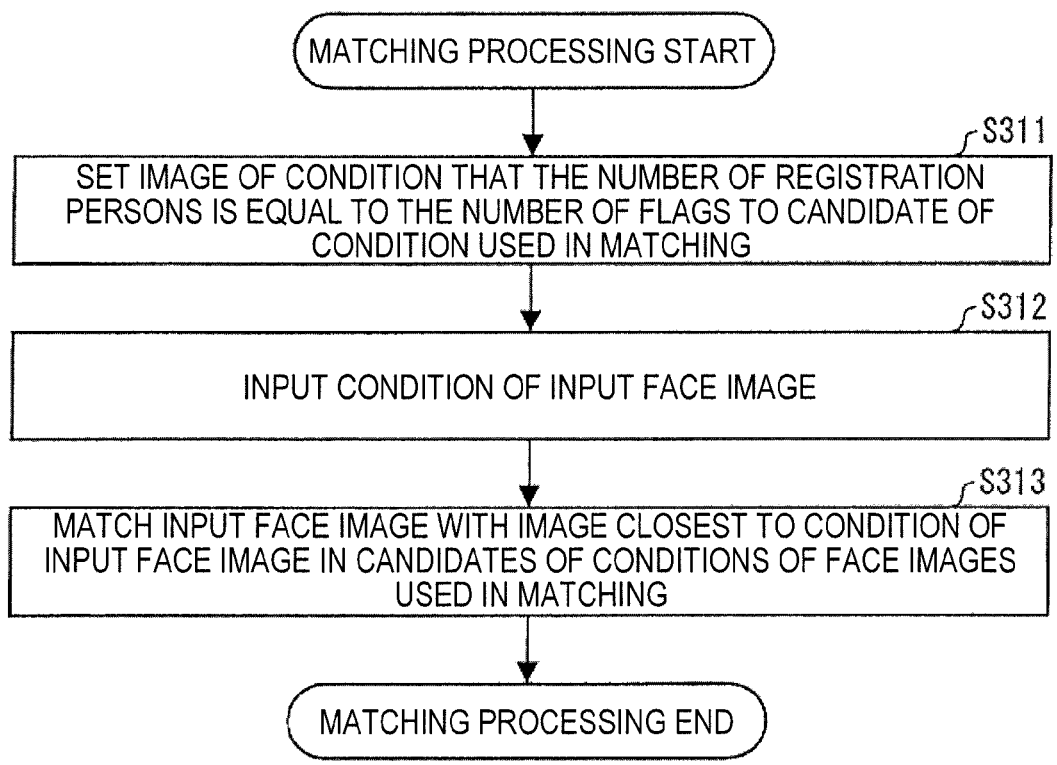
FIG. 12 is a flowchart illustrating an example of a matching processing flow in the face matching device.

A matching processing flow of the face matching device 10B will be described below with reference to FIG. 12. FIG. 12 is a flowchart illustrating an example of the matching processing flow.

The flag determination unit 38 refers to the summary information storage unit 22 to select the registration face image that the number of registration persons becomes equal to the number of flags as the candidate of the registration face image used in the matching processing (S311).

The condition detecting unit 32 analyzes the input face image obtained from the face image obtaining unit 31, and detects the photographing condition of the input face image (S312).

The matching unit 36B performs the matching of the input face image using the registration face image that is selected as the candidate by the condition detecting unit 32 (S313).

(Specific Example)

Figure 13:
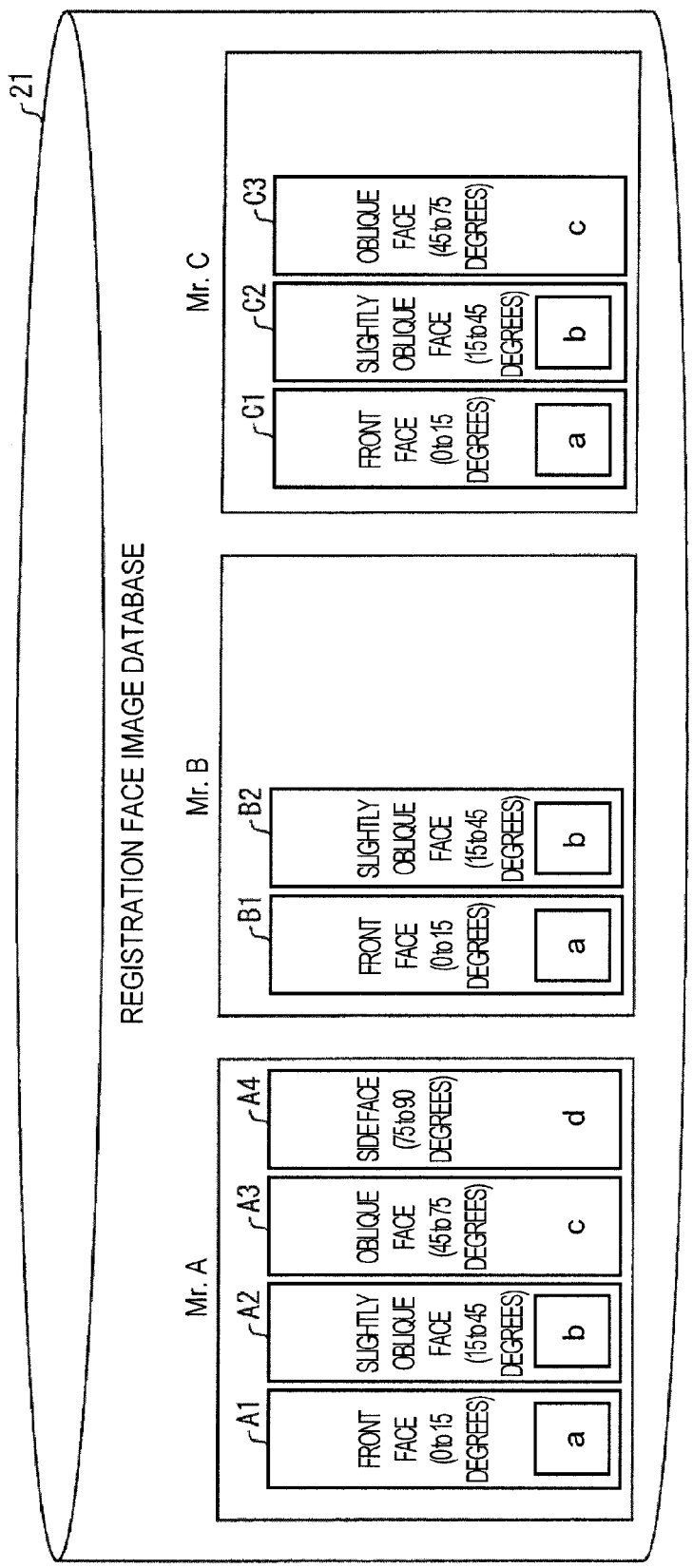
FIG. 13 is a view illustrating an example of registration data that is stored in a registration face image database included in the face matching device.

A specific example of the flag setting will be described below with reference to FIG. 13 and FIG. 14. FIG. 13 is a view illustrating an example in which the flag is set to the registration data illustrated in FIG. 2.

In registering the face image, the face image registering unit 34B sets flags a, b, c, and d to the photographing conditions of the "front face (0 to 15 degrees)", the "slightly oblique face (15 to 45 degrees)", the "oblique face (45 to 75 degrees)", and the "side face (75 to 90 degrees)", respectively.

In the registration face image database 21 illustrated in FIG. 13, the photographing conditions of the registration face images A1 to A4 are registered with respect to Mr. A. Therefore, the flags a, b, c, and d is set to the photographing conditions of the registration face images A1, A2, A3, and A4.

With respect to Mr. B, the flag a is set to the photographing condition of the "front face (0 to 15 degrees)" of the registration face image B1, and the flag b is set to the photographing condition of the "slightly oblique face (15 to 45 degrees)" of the registration face image B2.

The flags a, b, and c are set to the photographing conditions of the registration face images C1, C2, and C3 with respect to Mr. C.

The photographing condition of the "front face (0 to 15 degrees)" and the photographing condition of the "slightly oblique face (15 to 45 degrees)" are commonly registered with respect to each of the persons Mr. A, Mr. B, and Mr. C.

Flag summary of the face image registering unit 34B will be described in detail with reference to FIG. 14. FIG. 14 illustrates an example of the summary information stored in the summary information storage unit 22.

Figure 14:
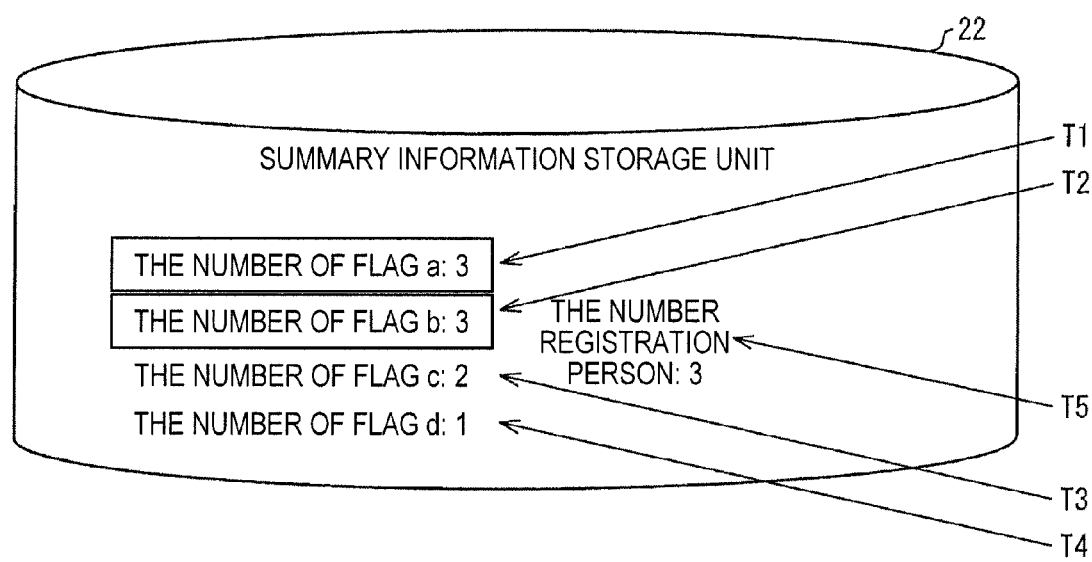
FIG. 14 is a view illustrating an example of summary information that is stored in a summary information storage unit included in the face matching device.

As illustrated in FIG. 14, the face image registering unit 34B sets the following items as the summary information based on the registration data of the registration face image database 21.

The face image registering unit 34B summarizes the number of registration persons to set an item T5 of the number of registration persons to "3". Because the flag a and the flag b are set for the pieces of registration data of Mr. A, Mr. B, and Mr. C, the face image registering unit 34B sets an item T1 of the number of flags a and an item T2 of the number of flags b to "3". Because the flag c is set for the pieces of registration data of Mr. A and Mr. C, the face image registering unit 34B sets an item T3 of the number of flags c to "2". Because the flag d is set only for the registration data of Mr. A, the face image registering unit 34B sets an item T4 of the number of flags d to "1".

Accordingly, the number of flags a and the number of flags b are matched with the numbers of registration persons, and the matching unit 36B uses the registration face image of the photographing condition in which the flag a or the flag b is set in the matching processing.

When the number of flags a and the number of flags b are matched with the numbers of registration persons, matching information indicating that the number of flags a and the number of flags b are matched with the numbers of registration persons may be provided to the item T1 of the number of flags a and the item T2 of the number of flags b. The matching unit 36B may use the registration face image of the photographing condition to which the matching information is provided in the matching processing.

Fourth Embodiment

Figure 16:
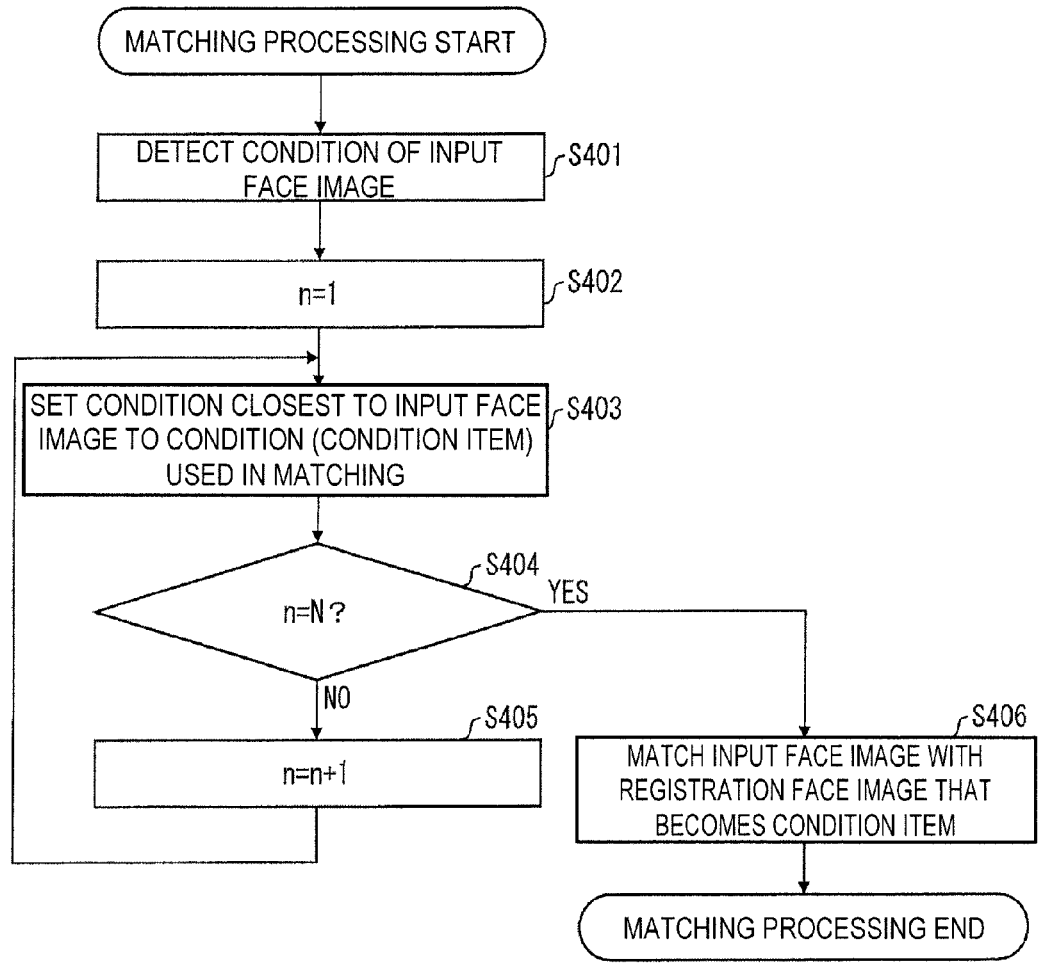
FIG. 16 is a flowchart illustrating an example of a matching processing flow in the face matching device.
Figure 17:
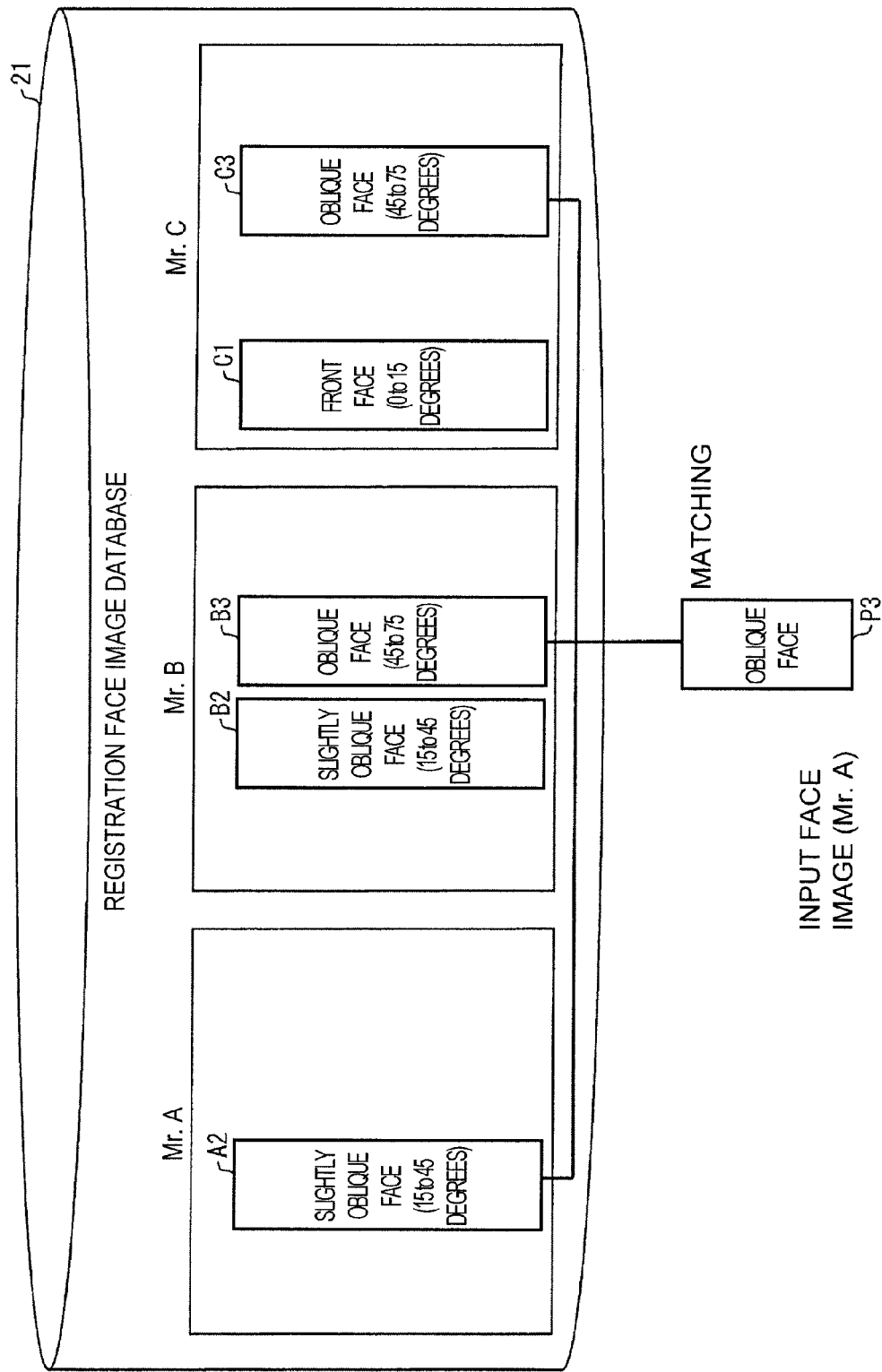
FIG. 17 is a view illustrating a specific example of a selection process in the face matching device.

A face matching device according to a fourth embodiment of the invention will be described with reference to FIG. 15 to FIG. 17. For the sake of convenience, the component having the same function as that of the first to third embodiments is designated by the same numeral, and the description is omitted.

A face matching device (the matching device) 10C of the third embodiment will be described with reference to FIG. 15. In the face matching device 10C, when the photographing condition registered common to the persons does not exist in the matching processing, the registration face image that corresponds to the photographing condition closest to the photographing condition of the input face image is selected with respect to each person, and the input face image is matched using the selected registration face image.

Therefore, the requirement of the use of the registration face image that corresponds to the photographing condition registered common to the persons is relaxed in the matching processing of the face matching device 10C.

Because the registration processing is similar to that of the face matching device 10, the description is omitted.

(Detailed Configuration)

Figure 15:
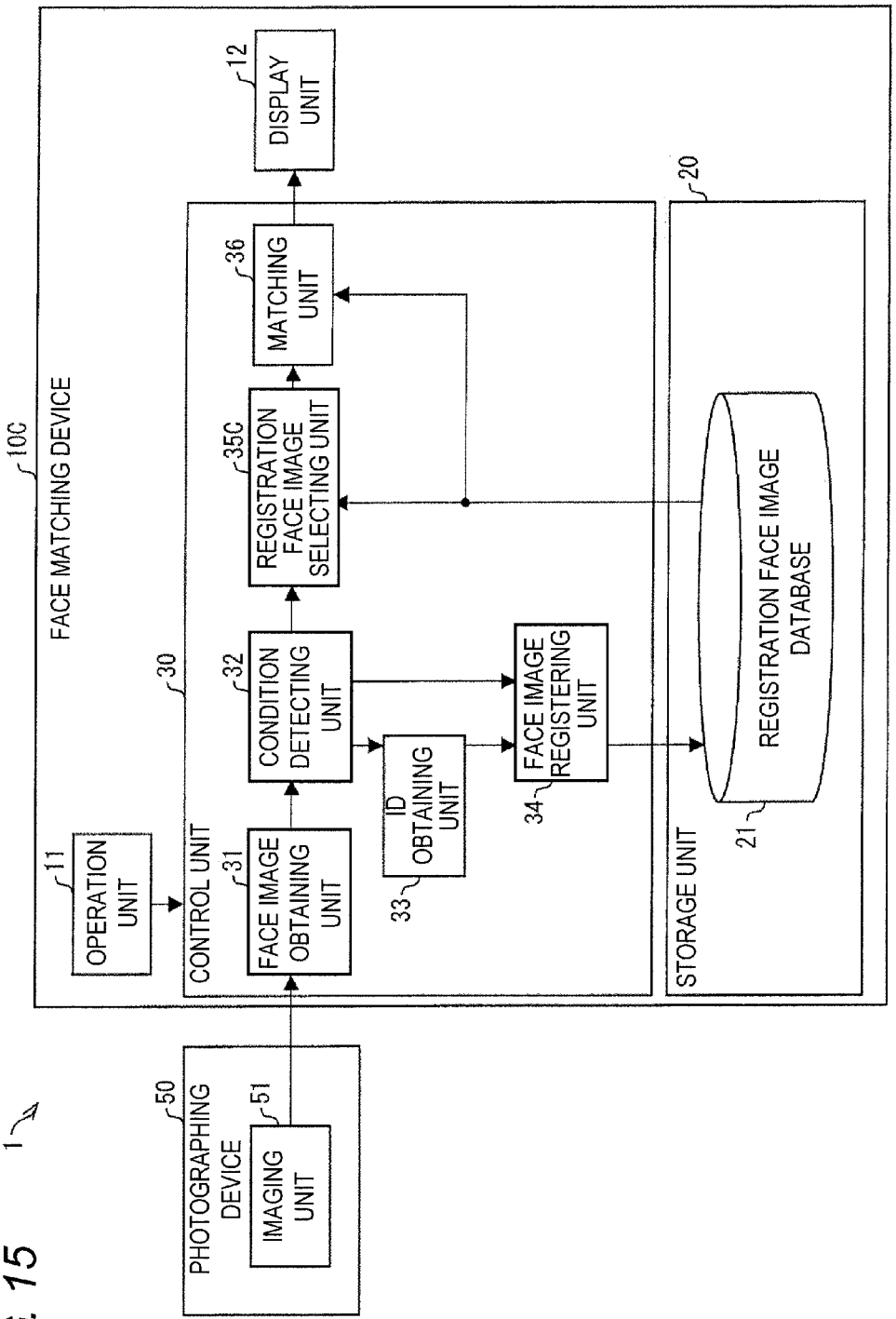
FIG. 15 is a functional block diagram illustrating a configuration example of a face matching device according to a further another embodiment of the invention.

As illustrated in FIG. 15, in the face matching device 10C, the registration face image selecting unit 35 of the face matching device 10 illustrated in FIG. 1 is replaced with a registration face image selecting unit (the condition determination means and the condition specifying means) 35C.

The registration face image selecting unit 35C selects the registration face image used in the matching processing. When the photographing condition registered common to the persons exists, the registration face image selecting unit 35C specifies the photographing condition closest to the photographing condition of the input face image, and selects the registration face image that corresponds to the specified photographing condition as the registration face image used in the matching processing.

On the other hand, when the photographing condition registered common to the persons does not exist, the registration face image selecting unit 35C selects the registration face image that corresponds to the photographing condition closest to the photographing condition of the input face image as the registration face image used in the matching processing with respect to each person.

(Matching Processing Flow)

A matching processing flow in the face matching device 100 will be described below with reference to FIG. 16. FIG. 16 is a flowchart illustrating an example of the matching processing flow.

The condition detecting unit 32 analyzes the input face image obtained from the face image obtaining unit 31, and detects the photographing condition of the input face image (S401).

The registration face image selecting unit 35C sets the registration person variable n to 1 (S402). The registration face image selecting unit 35C sets the photographing condition closest to the photographing condition of the input face image in the photographing conditions of the registration face images to the condition item with respect to the nth person (S403).

The registration face image selecting unit 35C determines whether the registration person variable n is equal to N (S404). At this point, the registration face image selecting unit 35C confirms whether the condition item is selected with respect to all the registration persons.

When the registration person variable n is not equal to N (NO in S404), the registration face image selecting unit 35C increments the registration person variable n by 1 (S405), the flow returns to S403, and selects the photographing condition closest to the photographing condition of the input face image as the condition item with respect to nth person.

When the loop is repeatedly performed to obtain the photographing condition common to the persons until the registration person variable n becomes equal to N (YES in S404), the matching unit 36 performs the matching of the input face image based on the registration face image that corresponds to the photographing condition selected as the condition item (S406).

(Specific Example)

A specific example of the selection process in the matching processing will be described below with reference to FIG. 17. As illustrated in FIG. 17, the following pieces of registration data with respect to the person are stored in the registration face image database 21.

The registration face image A2 of the photographing condition of the "slightly oblique face (15 to 45 degrees)" is registered with respect to Mr. A. The registration face image B2 of the photographing condition of the "slightly oblique face (15 to 45 degrees)" and the registration face image B3 of the photographing condition of the "oblique face (45 to 75 degrees)" are registered with respect to Mr. B. The registration face image C1 of the photographing condition of the "front face (0 to 15 degrees)" and the registration face image C3 of the photographing condition of the "oblique face (45 to 75 degrees)" are registered with respect to Mr. C.

When the input face image P3 of Mr. A that is photographed on the photographing condition of the "oblique face" is input as the face image, the selection process of the face matching device 10C becomes as follows.

Because only the registration face image A2 is registered in the registration face image database 21 with respect to Mr. A, the photographing condition of the registration face image A2 is selected as the condition item.

Because the photographing condition of the registration face image B3 in the two registered pieces of registration data is matched with the photographing condition of the input face image with respect to Mr. B, the registration face image selecting unit 35C selects the registration face image B3.

Because the photographing condition of the registration face image BC in the two registered pieces of registration data is matched with the photographing condition of the input face image with respect to Mr. C, the registration face image selecting unit 35C selects the registration face image B3.

The matching unit 36 performs the matching of the input face image P3 using the selected registration face images A2, B3, and C3.

Even if the photographing condition common to the persons is not registered, the face matching device 100 selects the photographing condition closest to the photographing condition of the input face image to use the selected photographing condition in the matching processing. Therefore, even if the photographing condition common to the persons is not registered, the photographing conditions of the registration face images used in the matching processing are uniformed as much as possible, which allows the improvement of the matching processing accuracy.

Fifth Embodiment

A face matching device according to a fifth embodiment of the invention will be described with reference to FIG. 16 to FIG. 21. For the sake of convenience, the component having the same function as that of the first to fourth embodiments is designated by the same numeral, and the description is omitted.

A face matching device (the matching device) 10D of the fifth embodiment will be described with reference to FIG. 18. In the face matching device 10D, a specific value indicating how much angle of the photographing direction from the front face is detected as the photographing condition of the input face image. In the face matching device 10, the photographing direction is detected within a predetermined range with respect to the photographing condition of the input face image. On the other hand, the face matching device 10D can detect the photographing direction as a continuous value.

Additionally, in the face matching device 10D, a detected specifying value is registered as the photographing condition of the registered face image during the registration processing. Additionally, in the face matching device 10D, the specifying value of the photographing condition detected from the input face image is compared to the specifying value registered as the photographing condition of the registration face image, a determination whether a difference between the specifying values falls within a predetermined range is made, and the matching processing is performed based on the determination result.

(Detailed Configuration)

Figure 18:
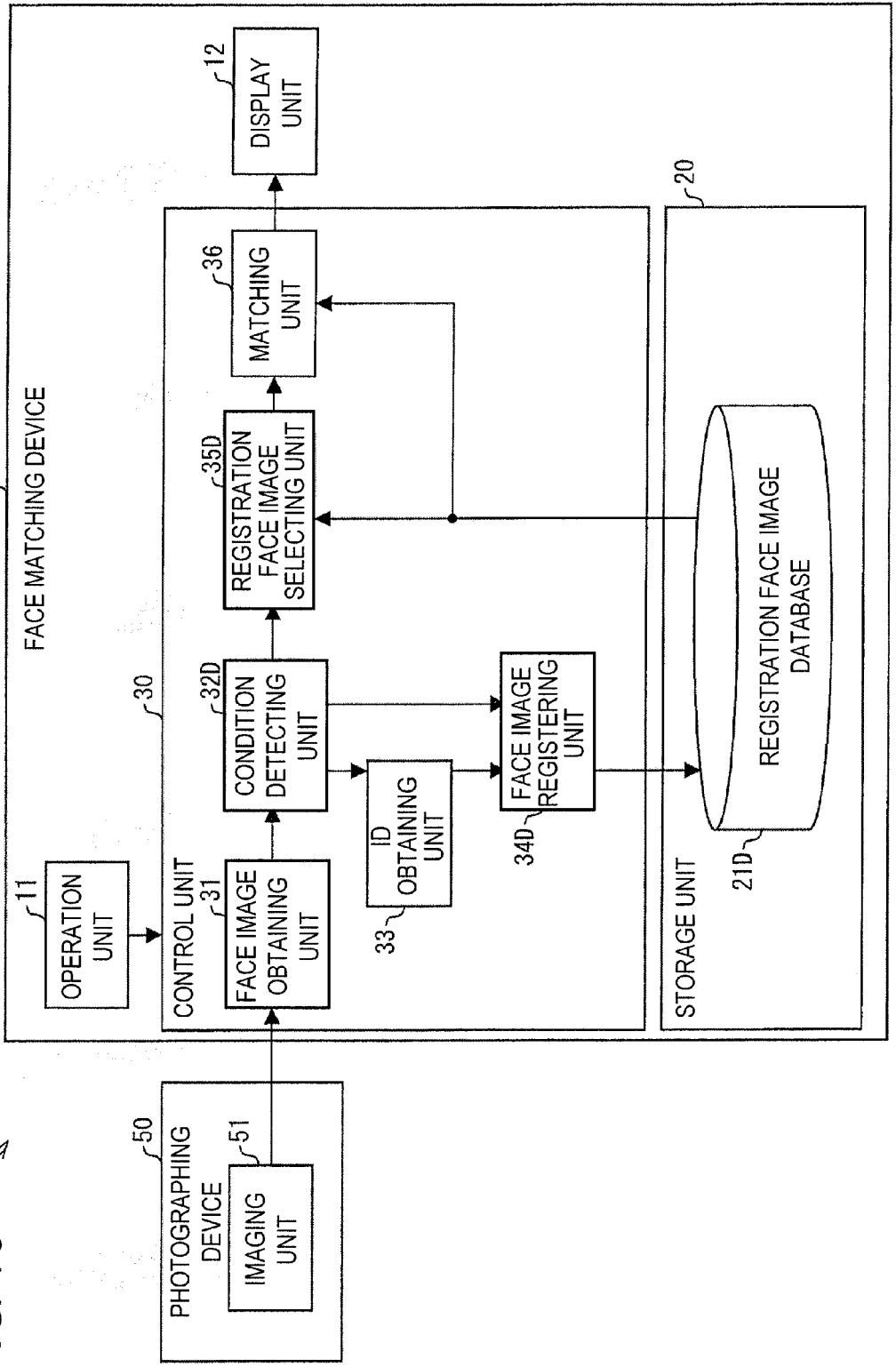
FIG. 18 is a functional block diagram illustrating a configuration example of a face matching device according to a further another embodiment of the invention.

As illustrated in FIG. 18, in the face matching device 10D, the registration face image database 21, condition detecting unit 32, face image registering unit 34, and registration face image selecting unit 35 of the face matching device 10 illustrated in FIG. 1 are replaced with a registration face image database 21D, a condition detecting unit 32D, a face image registering unit 34D and a registration face image selecting unit (the condition determination means and the condition specifying means) 35D, respectively.

The registration face image and the photographing condition are registered as the registration data in the registration face image database 21D with respect to each person while the registration face image and the photographing condition correspond to each other. At this point, the registration face image database 21D differs from the registration face image database 21 in how much angle of the photographing direction from the front face is registered as the photographing condition by the specific value. That is, the specifying value indicates the specific value in the continuous value from 0 degree to 90 degrees that is of an angle of the face orientation.

For example, when the person is photographed head-on, "0 degree" is registered. When the person is photographed right beside, "90 degrees" is registered.

The condition detecting unit 32D extracts the photographing condition from the input face image. The condition detecting unit 32D analyzes the face image to obtain the angle of the face orientation.

For example, when the person is photographed head-on in the input face image, the condition detecting unit 32D detects "0 degree" as the photographing condition. When the person is photographed right beside in the input face image, the condition detecting unit 32D detects "90 degrees" as the photographing condition.

During the registration processing, the condition detecting unit 32D transmits the extracted photographing condition to the face image registering unit 34. During the matching processing, the condition detecting unit 32D transmits the extracted photographing condition to the registration face image selecting unit 35D.

During the registration processing, the face image registering unit 34D provides the ID transmitted from the ID obtaining unit 33 to the input face image and photographing condition transmitted from the condition detecting unit 32D, and registers the input face image, the photographing condition, and the ID in the registration face image database 21D. At this point, the face image registering unit 34D differs from the face image registering unit 34 in that the face image registering unit 34D registers the specifying value of the angle of the face orientation as the photographing condition in the registration face image database 21D.

During the matching processing, the registration face image selecting unit 35D refers to the registration face image database 21D to select the registration face image used in the matching processing.

More specifically the registration face image selecting unit 35D refers to the registration face image database 21D, and selects the registration face image, in which the photographing condition is identical to the photographing condition of the input face image or falls within a predetermined range based on the photographing condition of the input face image, from the registration data of each person.

When the specifying value of the photographing condition of the registration face image falls within the predetermined range based on the specifying value of the photographing condition of the input face image, the photographing conditions of the registration face image and input face image are similar to each other to some extent. A range of the similar, identifiable condition, for example, a range of ±5 degrees can be set as the predetermined range.

(Registration Processing Flow)

Figure 19:
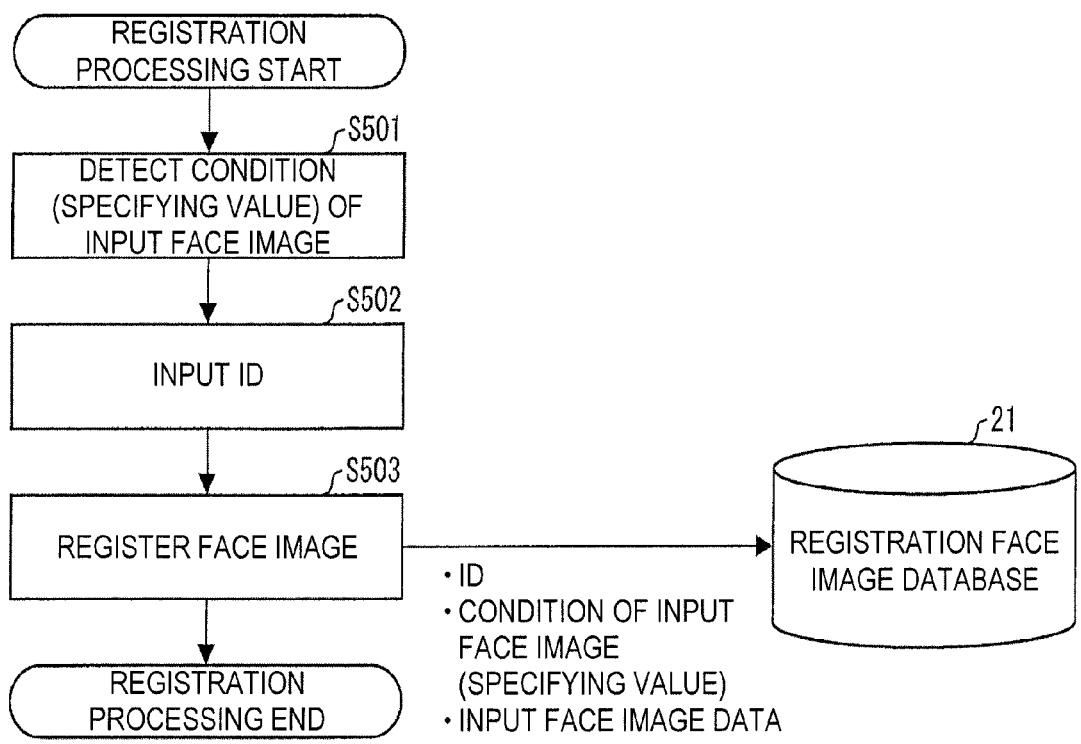
FIG. 19 is a flowchart illustrating an example of a registration processing flow in the face matching device.

A registration processing flow in the face matching device 10D will be described below with reference to FIG. 19. FIG. 19 is a flowchart illustrating an example of the registration processing flow.

The condition detecting unit 32 analyzes the input face image obtained from the face image obtaining unit 31, detects the photographing condition of the input face image in the form of specifying value (S501).

The ID obtaining unit 33 obtains the ID input from the operation unit 11 (S502).

The face image registering unit 34D registers the ID, the input face image, and the photographing condition (specifying value) in the registration face image database 21 while the ID, the input face image, and the photographing condition (specifying value) correspond to one another (S503).

(Matching Processing Flow)

Figure 20:
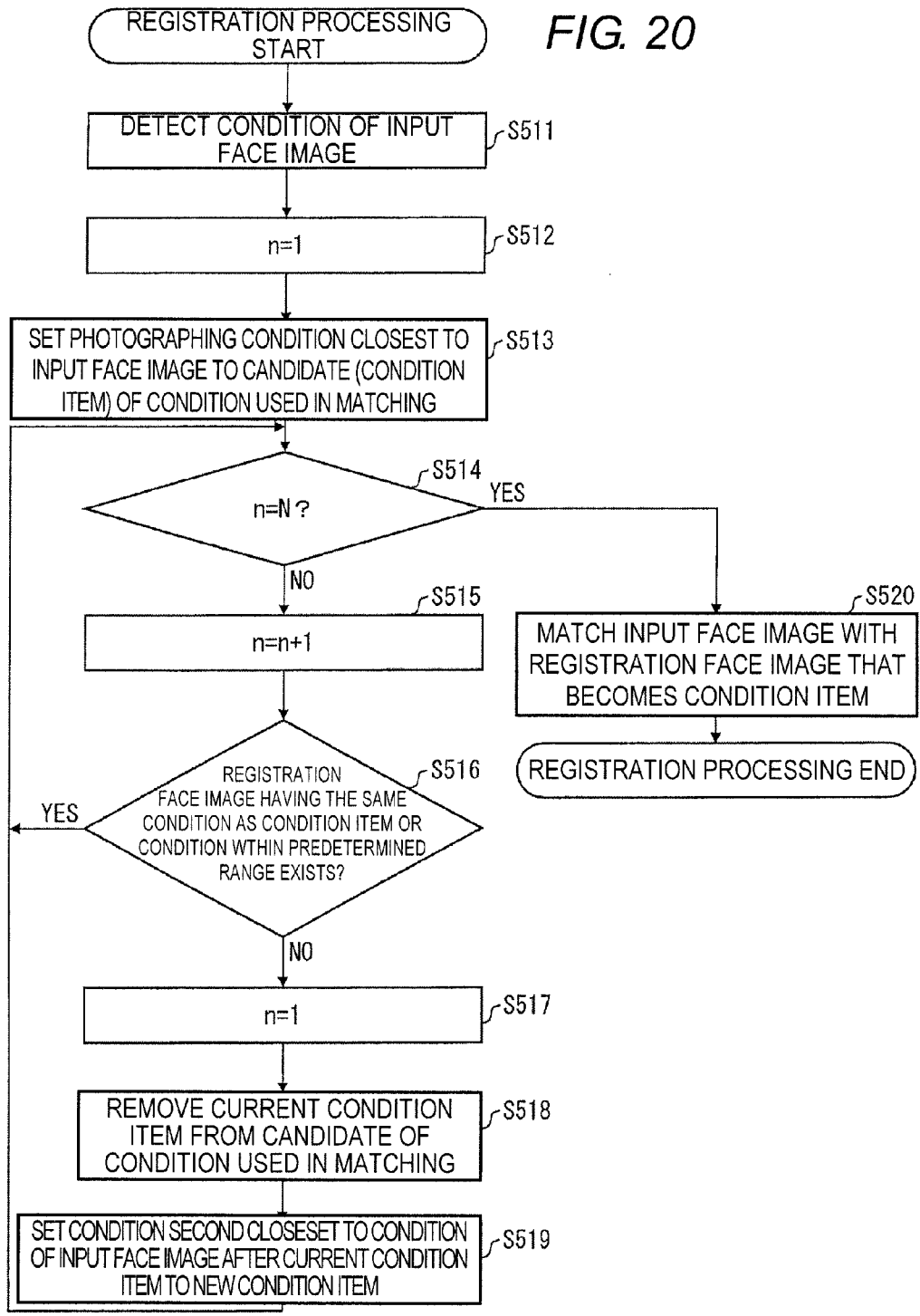
FIG. 20 is a flowchart illustrating an example of a matching processing flow in the face matching device.

A matching processing flow in the face matching device 10D will be described below with reference to FIG. 20. FIG. 20 is a flowchart illustrating an example of the matching processing flow.

The condition detecting unit 32D analyzes the input face image obtained from the face image obtaining unit 31, and detects the photographing condition of the input face image in the form of specifying value (S511).

The registration face image selecting unit 35D sets the registration person variable n to 1 (S512).

Then the registration face image selecting unit 35D sets the photographing condition closest to the photographing condition of the input face image in the registered photographing conditions to the condition item used in the matching with respect to the person whose registration person variable n is 1 (S513). The closeness of the registered photographing condition and the photographing condition of the input face image can be expressed by a difference between the specifying value of the registered photographing condition and the specifying value of the photographing condition of the input face image. That is, the registered photographing condition and the photographing condition of the input face image comes to closer to each other with decreasing difference between the specifying value of the registered photographing condition and the specifying value of the photographing condition of the input face image.

The registration face image selecting unit 35D determines whether the registration person variable n is equal to 1 (S514). At this point, the registration face image selecting unit 35D determines the ending condition when the registration face image is selected.

When the registration person variable n is not equal to N (NO in S514), the registration face image selecting unit 35D increments the registration person variable n by 1 (S515), and determines whether the same photographing condition as the specifying value of the current condition item or the photographing condition that falls within the predetermined range based on the specifying value of the condition item is registered with respect to the nth person (S516).

When the same photographing condition as the specifying value of the current condition item or the photographing condition that falls within the predetermined range based on the specifying value of the condition item is registered with respect to the nth person (YES in S516), the flow returns to S514. The loop of S514 to S516 is used to determine whether the same photographing condition as the specifying value of the current condition item or the photographing condition that falls within the predetermined range based on the specifying value of the condition item is registered with respect to the nth person, and the loop is repeated in order up to the Nth person to determine the photographing condition.

On the other hand, when the same photographing condition as the specifying value of the current condition item or the photographing condition that falls within the predetermined range based on the specifying value of the condition item is not registered with respect to the nth person (NO in S516), the registration face image selecting unit 35D sets the registration person variable n to 1 (S517), and removes the current condition item from the candidate of the condition used in the matching (S518). This is because the condition item is not the photographing condition registered common to the persons when the same photographing condition as the specifying value of the current condition item or the photographing condition that falls within the predetermined range based on the specifying value of the condition item is not registered with respect to the nth person.

Then the photographing condition second closest to the photographing condition of the input face image after the current condition item is set to the new condition item (S519), and the flow returns to S514.

When the photographing condition common to the persons is obtained by repeating the loop until the registration person variable n becomes N (YES in S514), the matching unit 36 performs the matching of the input face image based on the registration face image that corresponds to the obtained photographing condition (S520).

(Specific Example)

The registration data stored in the registration face image database and a specific example of the matching processing in storing the registration data will be described with reference to FIG. 21.

Figure 21:
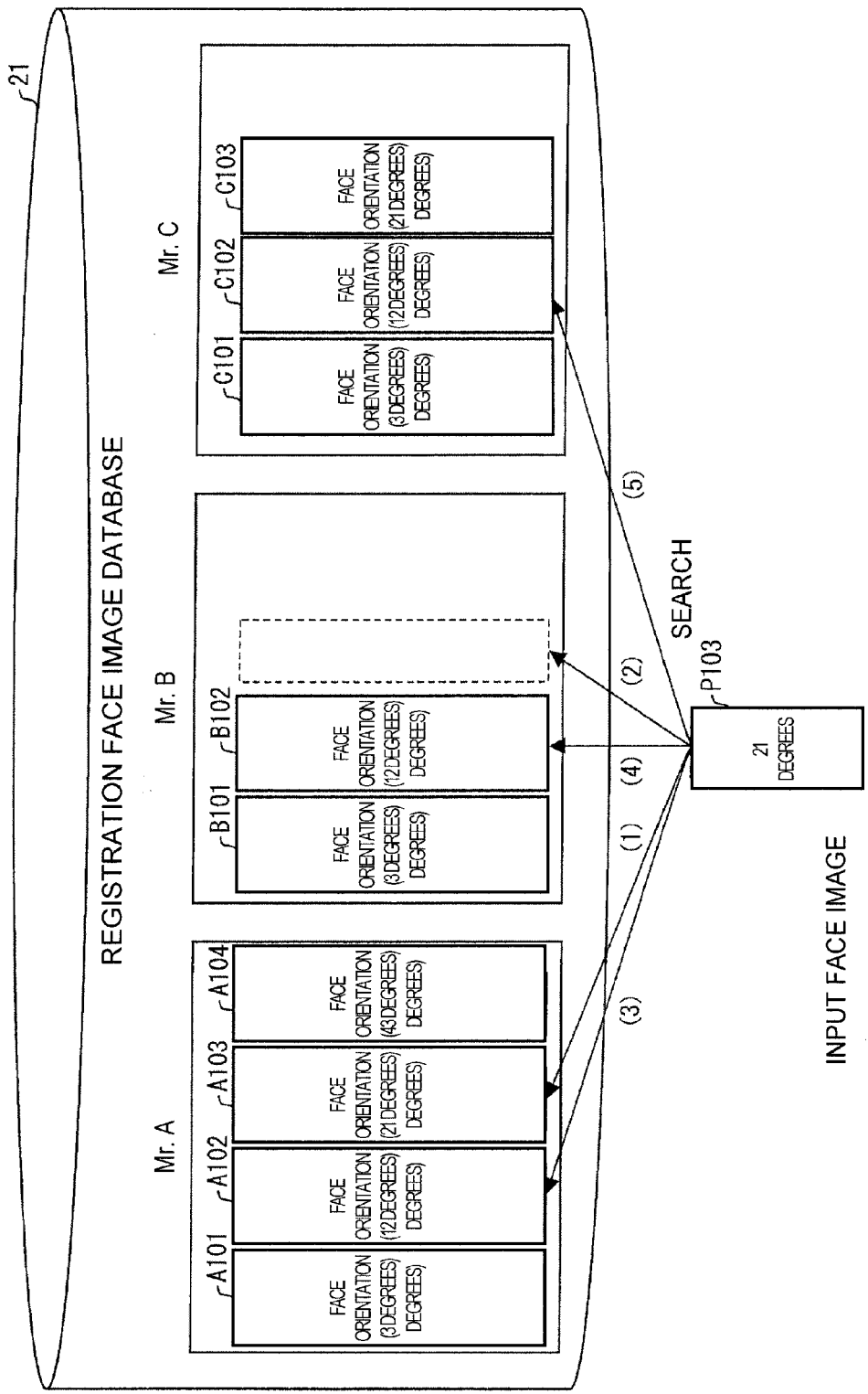
FIG. 21 is a view illustrating an example of registration data that is stored in a registration face image database included in the face matching device.
Figure 22:
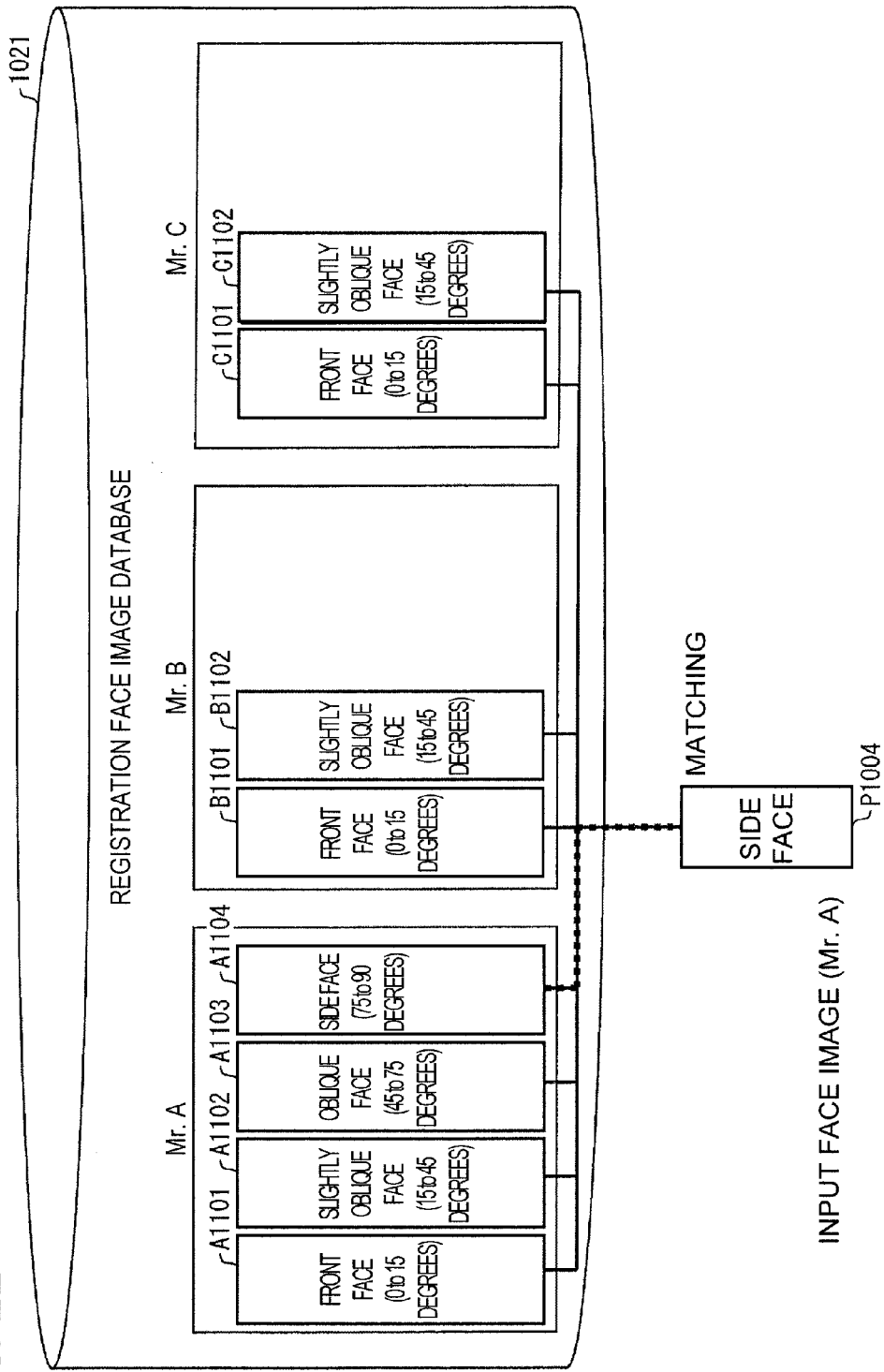
FIG. 22 is a view explaining conventional matching processing.
Figure 23:
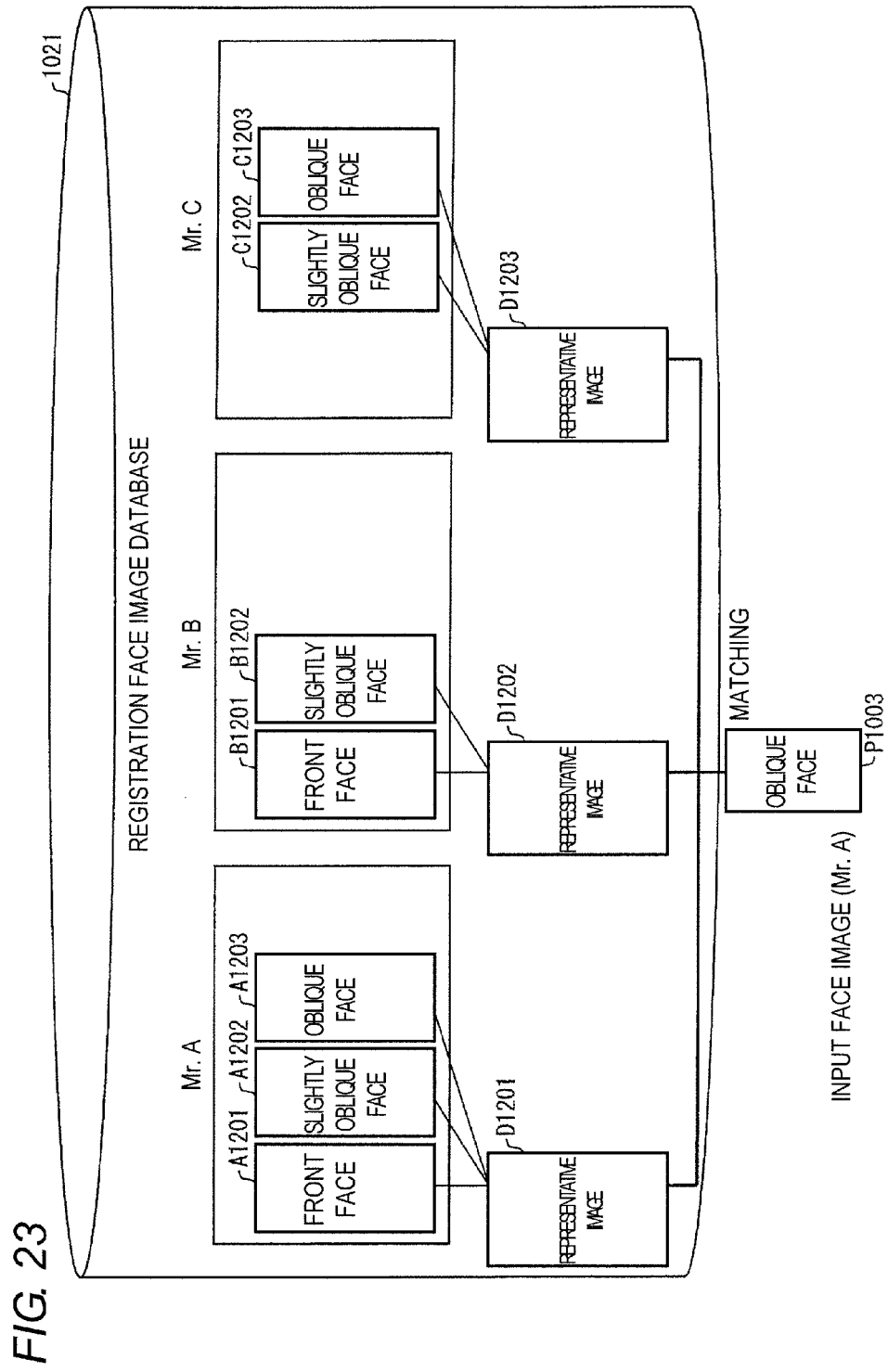
FIG. 23 is a view explaining conventional matching processing.
Figure 24:
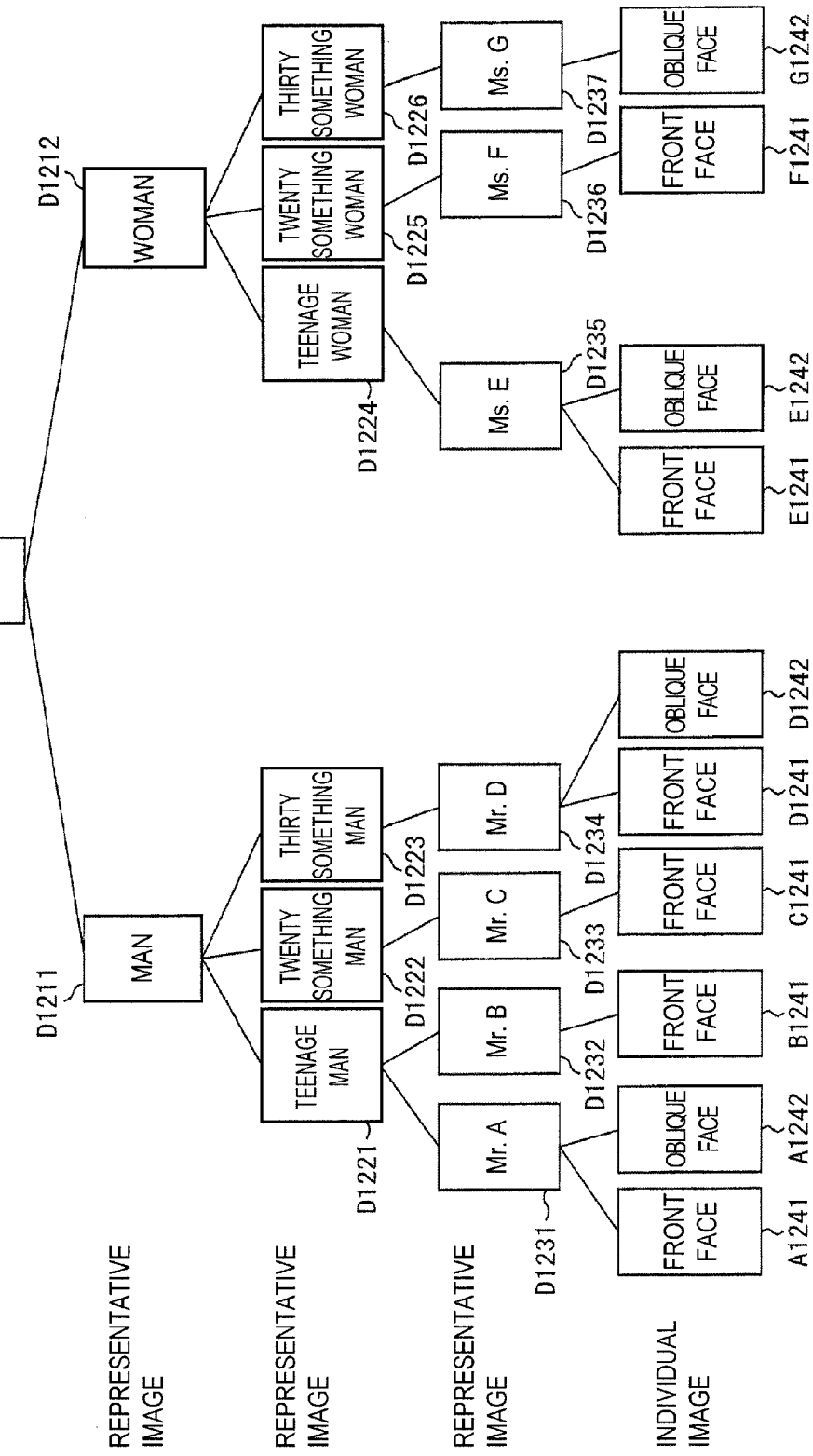
FIG. 24 is a view explaining conventional matching processing.
Figure 25:
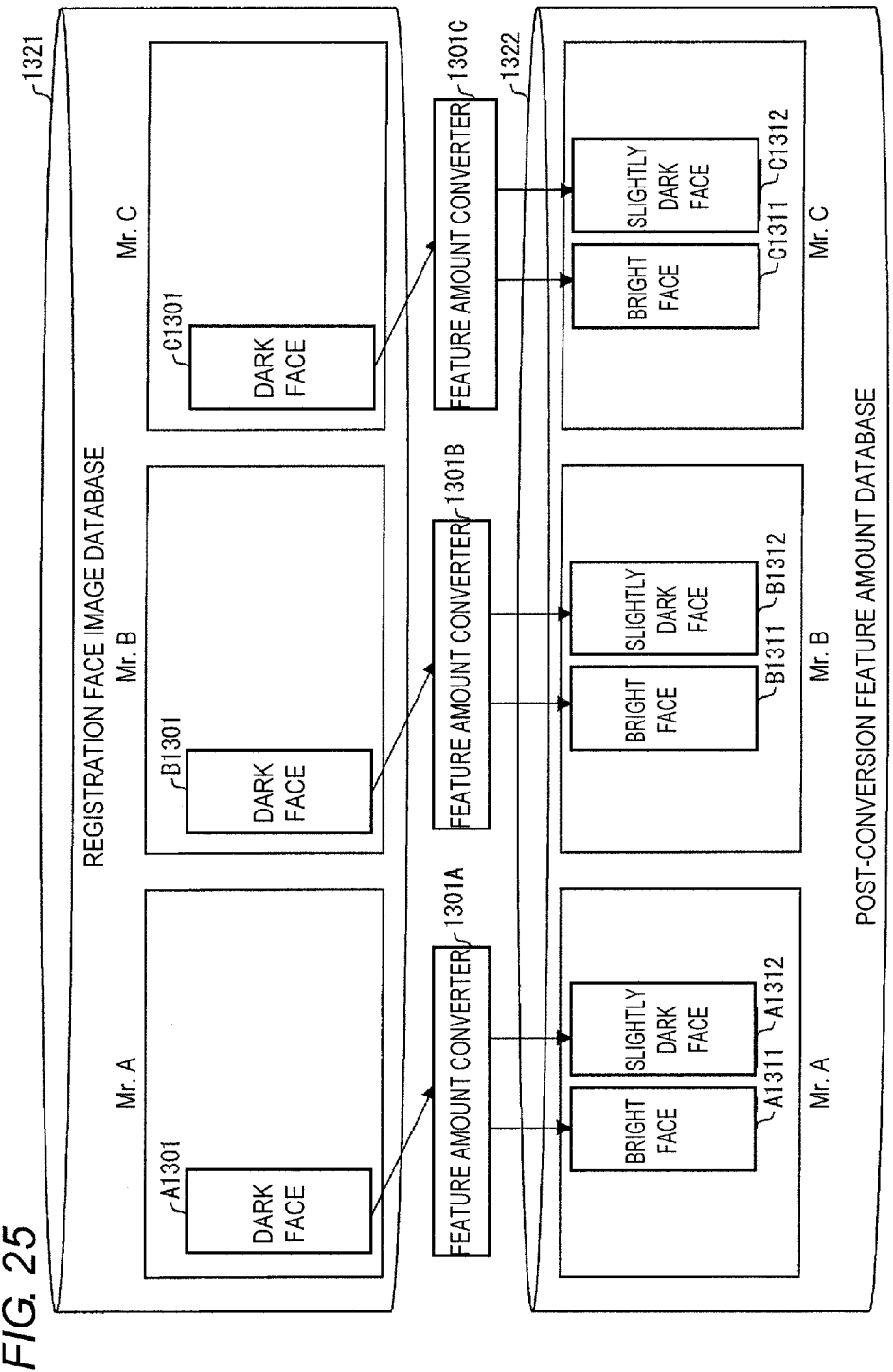
FIG. 25 is a view explaining conventional matching processing.
Figure 26:
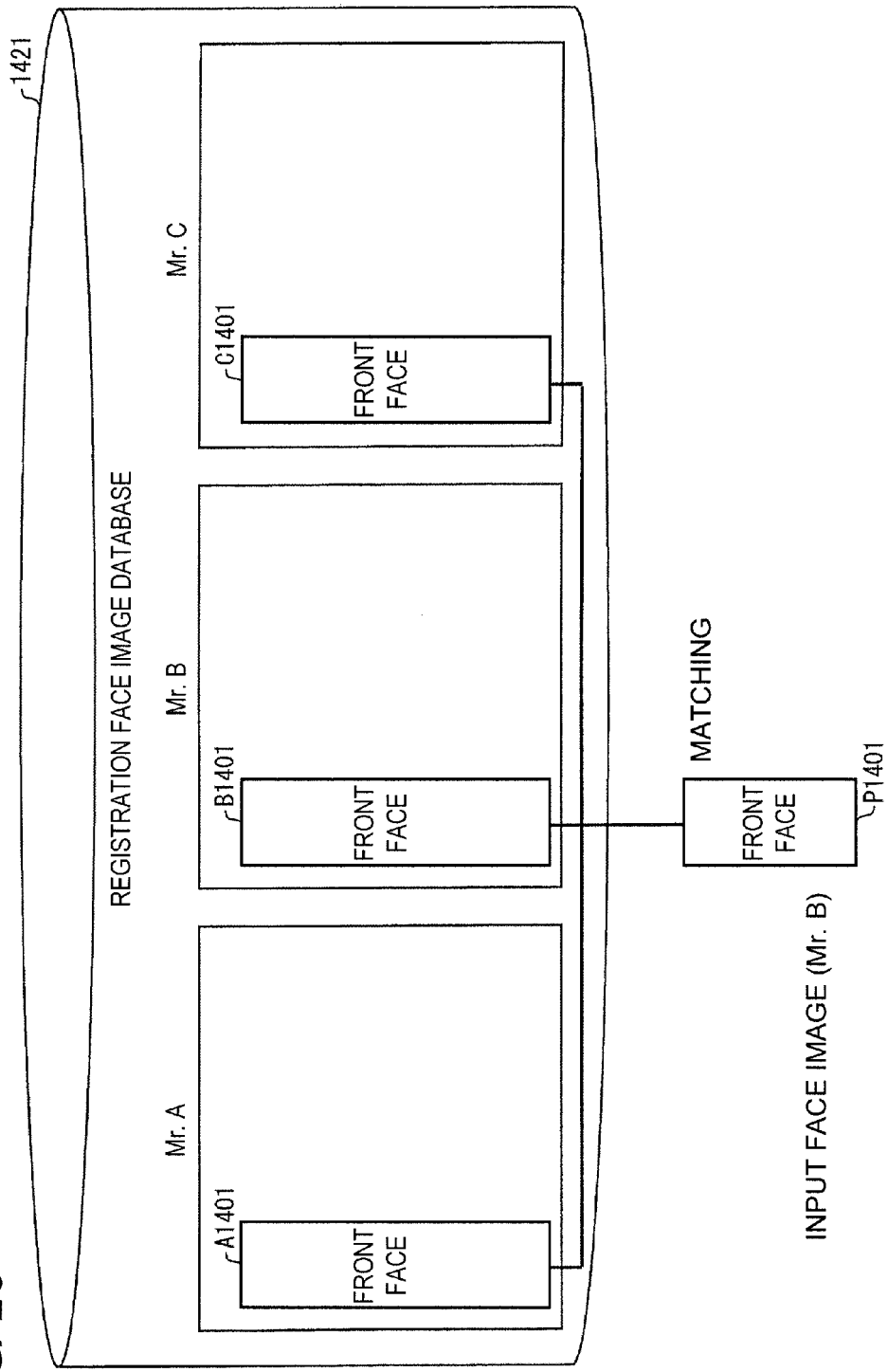
FIG. 26 is a view explaining conventional matching processing.
Figure 27:
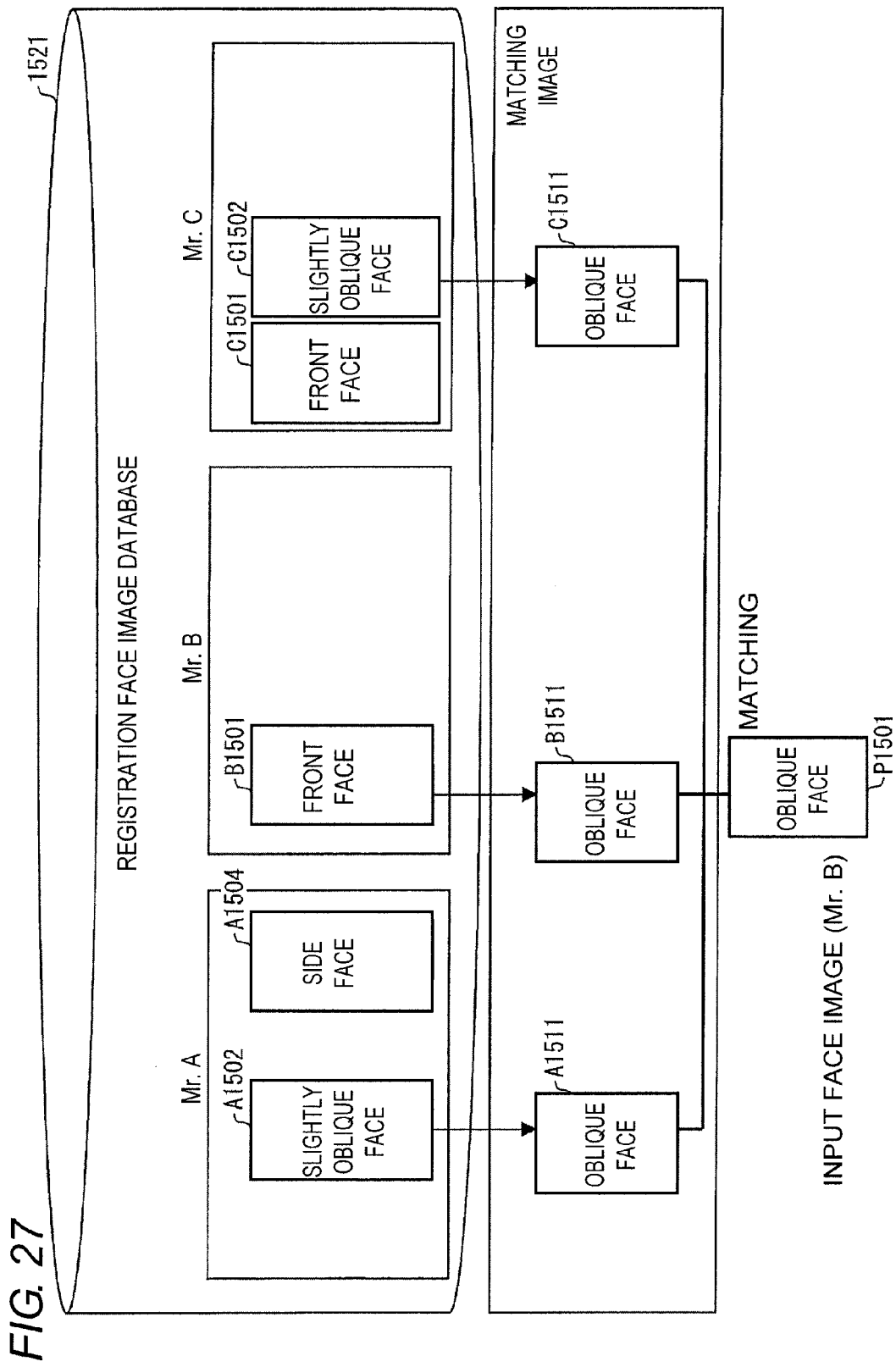
FIG. 27 is a view explaining conventional matching processing.
Figure 28:
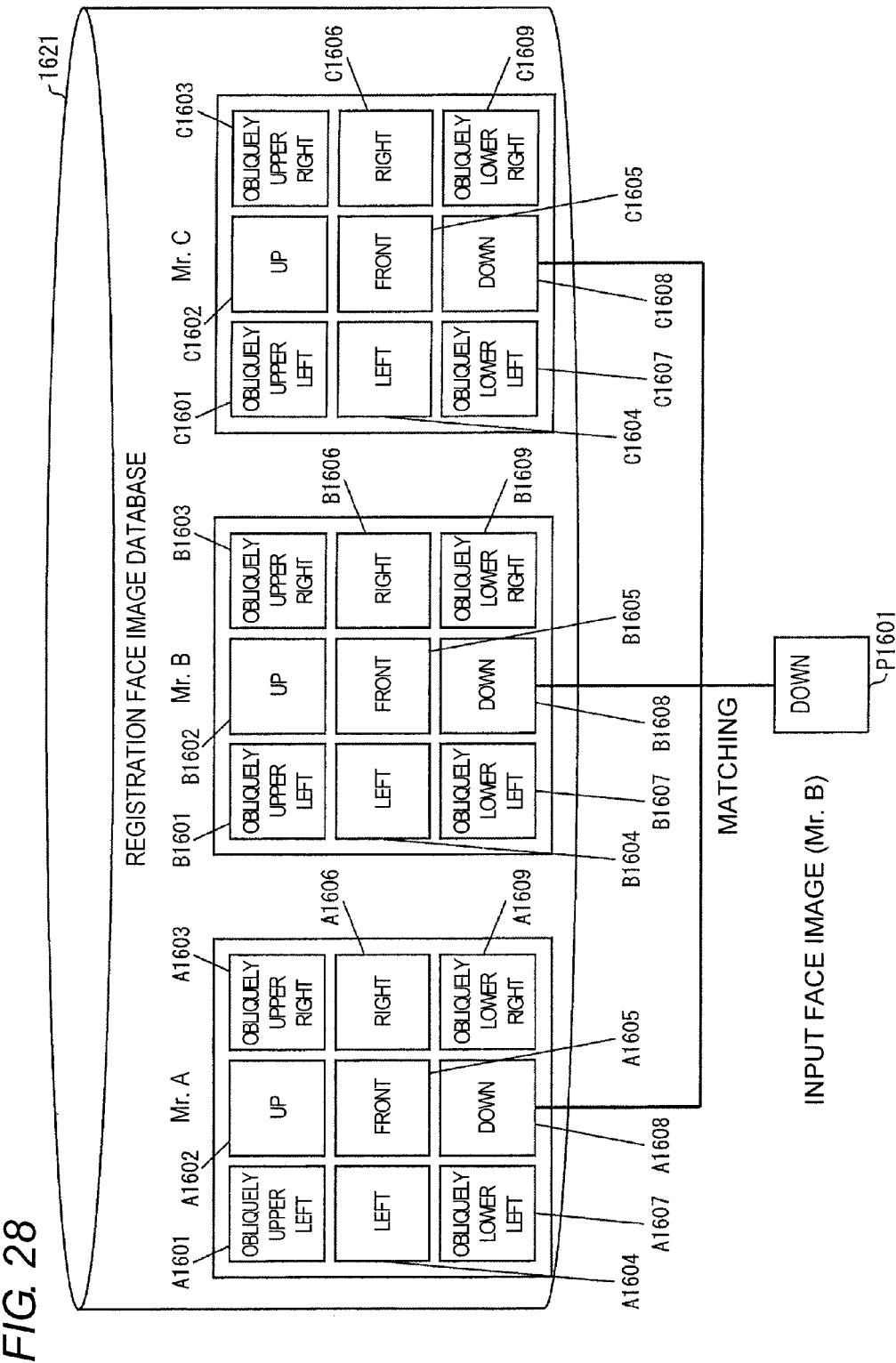
FIG. 28 is a view explaining conventional matching processing.

As illustrated in FIG. 21, the following pieces of registration data with respect to the person are stored in the registration face image database 21D.

A registration face image A101 of a photographing condition of a "face orientation (3 degrees)", a registration face image A102 of a photographing condition of a "face orientation (12 degrees)", a registration face image A103 of a photographing condition of a "face orientation (21 degrees)", and a registration face image A104 of a photographing condition of a "face orientation (43 degrees)" are registered with respect to Mr. A.

A registration face image B101 of the photographing condition of the "face orientation (3 degrees)" and a registration face image B102 of the photographing condition of the "face orientation (12 degrees)" are registered with respect to Mr. B.

A registration face image C101 of the photographing condition of the "face orientation (3 degrees)", a registration face image C102 of the photographing condition of the "face orientation (12 degrees)", and a registration face image C103 of the photographing condition of the "face orientation (21 degrees)" are registered with respect to Mr. C.

When the input face image P3 that is photographed on the photographing condition of the "face orientation (21 degrees)" is input as the face image, the selection process of the face matching device 10D becomes as follows.

The condition detecting unit 32D analyzes an input face image P103 to fix the angle of the face orientation, thereby obtaining the photographing condition of the "face orientation (21 degrees)".

(1) The registration face image selecting unit 35D determines whether the same photographing condition as the photographing condition of the "face orientation (21 degrees)" of the input face image P103 or the photographing condition that falls within the predetermined range based on the photographing condition of the "face orientation (21 degrees)" is registered with respect to "Mr. A". Because the photographing condition of the "face orientation (21 degrees)" is registered while corresponding to the registration face image A103, the registration face image selecting unit 35D selects the registration face image A103.

(2) The registration face image selecting unit 35D determines whether the same photographing condition as the photographing condition of the "face orientation (21 degrees)" or the photographing condition that falls within the predetermined range based on the photographing condition of the "face orientation (21 degrees)" is registered with respect to "Mr. B". (3) Because the photographing condition of the "face orientation (21 degrees)" is not registered with respect to "Mr. B", the registration face image selecting unit 35D confirms whether the photographing condition of the "face orientation (12 degrees)" of the input face image P103 is registered with respect to "Mr. A" after the photographing condition of the registration face image A103.

Because the photographing condition of the "face orientation (12 degrees)" is registered with respect to "Mr. A", the photographing condition of the "face orientation (12 degrees)" is set to the condition item. Then the registration face image selecting unit 35D confirms whether the photographing condition of the "face orientation (12 degrees)" is registered with respect to "Mr. B", and (4) the registration face image selecting unit 35D detects the registration face image B102 that corresponds to the photographing condition of the "face orientation (12 degrees)".

Then the registration face image selecting unit 35D confirms whether the photographing condition of the "face orientation (12 degrees)" is registered with respect to "Mr. C", and (5) detects the registration face image C102 that corresponds to the photographing condition of the "face orientation (12 degrees)".

Therefore, the registration face image selecting unit 35D selects the registration face images A102, B102, and C102 that correspond to the photographing condition of the "face orientation (12 degrees)" with respect to "Mr. A", "Mr. B", and "Mr. C", respectively. The matching unit 36 performs the matching of the input face image P103 based on the registration face images A102, B102, and C102.

The invention is not limited to the first to fifth embodiments, but various changes can be made without departing from the scope of the invention. An embodiment obtained by appropriately combining technical means disclosed in the different embodiments is also included in the technical range of the invention.

In the embodiments, each block of the face matching devices 10 and 10A to 10D, particularly the face image obtaining unit 31, condition detecting unit 32, ID obtaining unit 33, face image registering unit 34, registration face image selecting unit 35, and matching unit 36 of the face matching device 10, the registration face image preliminarily-selecting unit 37 and matching unit 36A of the face matching device 10A, the face image registering unit 34B, matching unit 36B, and flag determination unit 38 of the face matching device 10B, the registration face image selecting unit 35C of the face matching device 10C, and the condition detecting unit 32D, face image registering unit 34D, and registration face image selecting unit 35D of the face matching device 10D are realized by software using the CPU by way of example.

That is, the face matching devices 10 and 10A to 10D include the CPU (Central Processing Unit) that executes a command of a control program realizing each function, the ROM (Read Only Memory) in which the program is stored, the RAM (Random Access Memory) in which the program is expanded, and the storage device (recording medium) such as a memory in which the program and various pieces of data are stored. Program codes (an executable format program, an intermediate code program, and a source program) of the control programs that are of the software realizing the functions in the face matching devices 10 and 10A to 10D are recorded in the recording medium while the computer can read the program codes, the recording medium is supplied to the face matching devices 10 and 10A to 10D, and the computer (or the CPU or MPU) reads and executes the program code recorded in the recording medium.

Examples of the recording medium include tape system such as magnetic tape and cassette tape, disk systems including magnetic disks such as floppy disk (registered trademark) and a hard disk and optical disks such as a CD-ROM, an MO an MD, a DVD, and a CD-R, card systems such as an IC card (including a memory card) and an optical card, and semiconductor memory systems such as a mask ROM, an EPROM, an EEPROM and a flash ROM.

The face matching devices 10 and 10A to 10D are configured to be able to be connected to a communication network, and the program code may be supplied through the communication network. There is no particular limitation to the communication network. Examples of the communication network include the Internet, an intranet, an extranet, a LAN, an ISDN, a VAN, a CATV communication network, a virtual private network, a telephone line network, a mobile communication network, and a satellite communication network. There is no particular limitation to a transmission medium included in the communication network. Examples of the transmission medium include wired lines such as IEEE 1394, a USB, a power-line carrier, a cable TV line, a telephone line, and an ADSL line and wireless lines such as infrared ray such as IrDA and a remote controller, Bluetooth (registered trademark), 802.11 wireless, HDR, a mobile telephone network, a satellite line, and a terrestrial digital network. One or more embodiments of the present invention can be realized in the form of a computer data signal embedded in a carrier wave in which the program code is embodied by electronic transmission. Each block of the face matching devices 10 and 10A to 10D may also be formed by hardware logic.

Because one or more embodiments of the invention can be used in the matching of the object included in the image, the one or more embodiments of the invention can suitably be utilized in digital image instruments such as a printer, a scanner, and a personal computer, digital cameras, and the like.

What is claimed is:

1. An image matching device for matching an input image with a registration image, wherein the input image is an image of an object and is obtained from an imaging unit, and the registration image is from a registration image database comprising a plurality of registration images of a plurality of objects, each registration image having a different registration condition, the image matching device comprising:
   a condition detecting unit configured to:
      receive the input image from an image obtaining unit; and
      detect a detection condition associated with the object in the input image;
   a registration image selecting unit configured to:
      receive, from the condition detecting unit, the detection condition associated with the object in the input image;
      select a registration condition that is i) common to all objects registered in the registration image database; and ii) is closest to the detection condition; and
      select registration images of objects from the registration image database, each of the selected registration images having a registration condition that corresponds to the selected registration condition; and
   a matching unit configured to:
      obtain a degree of similarity between each of the selected registration images and the input image; and
      output an identification item of the registration image having the highest degree of similarity with the input image.

2. The image matching device of claim 1, wherein the registration image selecting unit selects the registration condition by:
   testing, for each object in the registration image database, whether a registration image exists that has a registration condition that is the same as the detection condition; and
   when each object in the registration image database has a registration condition that is the same as the detection condition, selecting the detection condition as the registration condition used for image matching; and
   when each object in the registration image database does not have a registration condition that is the same as the detection condition, removing the detection condition and setting a new detection condition that is closest to the detection condition.

3. The image matching device of claim 2, wherein the registration image selecting unit selects the registration condition by:
   testing, for each object in the registration image database, whether a registration image exists that has a registration condition that is the same as the new detection condition; and
   when each object in the registration image database has a registration condition that is the same as the new detection condition, selecting the new detection condition as the registration condition used for image matching.

4. The image matching device of claim 1, wherein the registration image selecting unit selects the registration condition by selecting a previously determined common registration condition based on the closeness of the previously determined common registration condition to the detection condition.

5. The image matching device of claim 1, wherein the image of the object obtained from the imaging unit is an image of a face of a person and the plurality of registration images of the plurality of objects is a plurality of registration images of a plurality of persons' faces.

6. The image matching device of claim 5, wherein the detection condition is a direction from which the face of the person is imaged and the registration condition is a direction from which a face of a person is imaged in a registration image.

7. The image matching device of claim 1, wherein the identification item output by the matching unit is at least one selected from a group consisting of a name and an identification number.

8. An image matching method for matching an input image with a registration image, wherein the input image is an image of an object and is obtained from an imaging unit, and the registration image from a registration image database comprising a plurality of registration images of a plurality of objects, each registration image having a different registration condition, the image matching method comprising:
   obtaining the input image from the imaging unit;
   receiving, by a condition detecting unit, the obtained input image from the image obtaining unit;
   detecting, by the condition detecting unit, a detection condition of the object of the input image;
   receiving, by a registration image selecting unit, the detection condition of the object of the input image;
   selecting, by the registration image selecting unit, a registration condition that is i) common to all objects registered in the registration image database; and ii) is closest to the detection condition; and
   selecting, by the registration image selecting unit, registration images of objects from the registration image database, each of the selected registration images having a registration condition that corresponds to the selected registration condition; and
   obtaining, by a matching unit, a degree of similarity between each of the selected registration images and the input image; and
   outputting, by the matching unit, an identification item of the registration image having the highest degree of similarity with the input image.

9. The image matching method of claim 8, wherein selecting the registration condition further comprises:
   testing, for each object in the registration image database, whether a registration image exists that has a registration condition that is the same as the detection condition; and
   when each object in the registration image database has a registration condition that is the same as the detection condition, selecting the detection condition as the registration condition used for image matching; and when each object in the registration image database does not have a registration condition that is the same as the detection condition, removing the detection condition and setting a new detection condition that is closest to the detection condition.

10. The image matching method of claim 9, wherein selecting the registration condition further comprises:

testing, for each object in the registration image database, whether a registration image exists that has a registration condition that is the same as the new detection condition; and when each object in the registration image database has a registration condition that is the same as the new detection condition, selecting the new detection condition as the registration condition used for image matching.

11. The image matching method of claim 9, wherein the image of the object is an image of a face of a person and the plurality of registration images of the plurality of objects is a plurality of registration images of a plurality of persons' faces.

12. The image matching method of claim 11, wherein the detection condition is a direction from which the face of the person is imaged and the registration condition is a direction from which a face of a person is imaged in a registration image.

13. The image matching method of claim 9, wherein the identification item is at least one selected from a group consisting of a name and an identification number.

* * * * *